(12) United States Patent
Gluckman et al.

(10) Patent No.: US 12,732,348 B1
(45) Date of Patent: Sep. 8, 2026

(54) GROUP ENCRYPTION USING UNBALANCED BINARY TREE ARCHITECTURE

(71) Applicant: Amazon Technologies, Inc., Seattle, WA (US)

(72) Inventors: Jason Gluckman, Encinitas, CA (US); John Strandberg, Phoenix, AZ (US); Zakiuddin Mohammed Zaheer, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/622,041

(22) Filed: Mar. 29, 2024

(51) Int. Cl.
*H04L 9/08* (2006.01)
*H04L 9/40* (2022.01)

(52) U.S. Cl.
CPC ........ *H04L 9/0833* (2013.01); *H04L 63/0428* (2013.01); *H04L 63/102* (2013.01); *H04L 63/104* (2013.01)

(58) Field of Classification Search
CPC . H04L 9/0833; H04L 63/0428; H04L 63/102; H04L 63/104
See application file for complete search history.

(56) References Cited

U.S. PATENT DOCUMENTS 11,405,789 B1 * 8/2022 Wei ........................ H04W 4/50
2003/0200448 A1 * 10/2003 Foster .................... G06F 21/64 726/30
2009/0063867 A1 * 3/2009 Granados .............. G06F 21/125 380/28
2009/0136030 A1 * 5/2009 Xie ....................... H04N 7/167 380/210

(Continued)

FOREIGN PATENT DOCUMENTS

WO WO-0208850 A2 * 1/2002 ............ G07C 9/257

OTHER PUBLICATIONS

Radha et al, Image Compression Using Binary Space Partitioning Trees, Dec. 1996, IEEE, pp. 1-15. (Year: 1996).*

(Continued)

*Primary Examiner* — Abu S Sholeman
(74) *Attorney, Agent, or Firm* — Pierce Atwood LLP

(57) ABSTRACT

A system configured to improve encryption architecture for camera video data. By using an unbalanced binary tree architecture, the system enables group encryption that prioritizes a constrained device (e.g., embedded camera device), thereby reducing an amount of processing required for the constrained device to encrypt video data. For example, placing the constrained device near the root of the unbalanced binary tree offloads processing from the constrained device to other group members. At each device operating as a member of the group, a privacy enforcement policy operates to authorize/authenticate messages, using time-sensitive encryption keys that enable refined control over decrypted content. In some examples, the architecture can enable end-to-end encryption by removing any cloud services from the group. Alternatively, the architecture can include a cloud service with high or low privileges, enabling refined control over decrypted content while providing additional functionality.

20 Claims, 18 Drawing Sheets

(56) References Cited

U.S. PATENT DOCUMENTS

| | | | | |
|---|---|---|---|---|
| 2011/0222687 | A1* | 9/2011 | Mori | H04N 7/1675 380/200 |
| 2013/0307971 | A1* | 11/2013 | Ganesan | H04N 21/21805 348/143 |
| 2017/0126672 | A1* | 5/2017 | Jang | H04L 63/0492 |
| 2017/0337813 | A1* | 11/2017 | Taylor | G05D 1/0285 |
| 2023/0362251 | A1* | 11/2023 | Tang | H04L 41/0893 |
| 2024/0323013 | A1* | 9/2024 | Dillon | H04L 9/0891 |
| 2025/0111764 | A1* | 4/2025 | Ramesh | G06V 20/52 |
| 2025/0342477 | A1* | 11/2025 | DeBellis | G06Q 20/382 |

OTHER PUBLICATIONS

Barnes, et al., "RFC 9420 The Messaging Layer Security (MLS) Protocol", IETF Trust, Jul. 2023, p. 1-132.
Beurdouche, et al., "The Messaging Layer Security (MLS) Architecture", IETF Trust, Jul. 2023, p. 1-53.
Beurdouche, et al., "Messaging Layer Security Towards a new era of secure messaging", BlackHat, 2019, p. 1-44.
Bossuat, et al., "Secure Messaging Apps and Group Protocols, Part 1", Quarkslab Blog, May 24, 2022, p. 1-13.
Bossuat, et al., "Secure Messaging Apps and Group Protocols, Part 2", Quarkslab Blog, Jun. 16, 2022, p. 1-18.

* cited by examiner

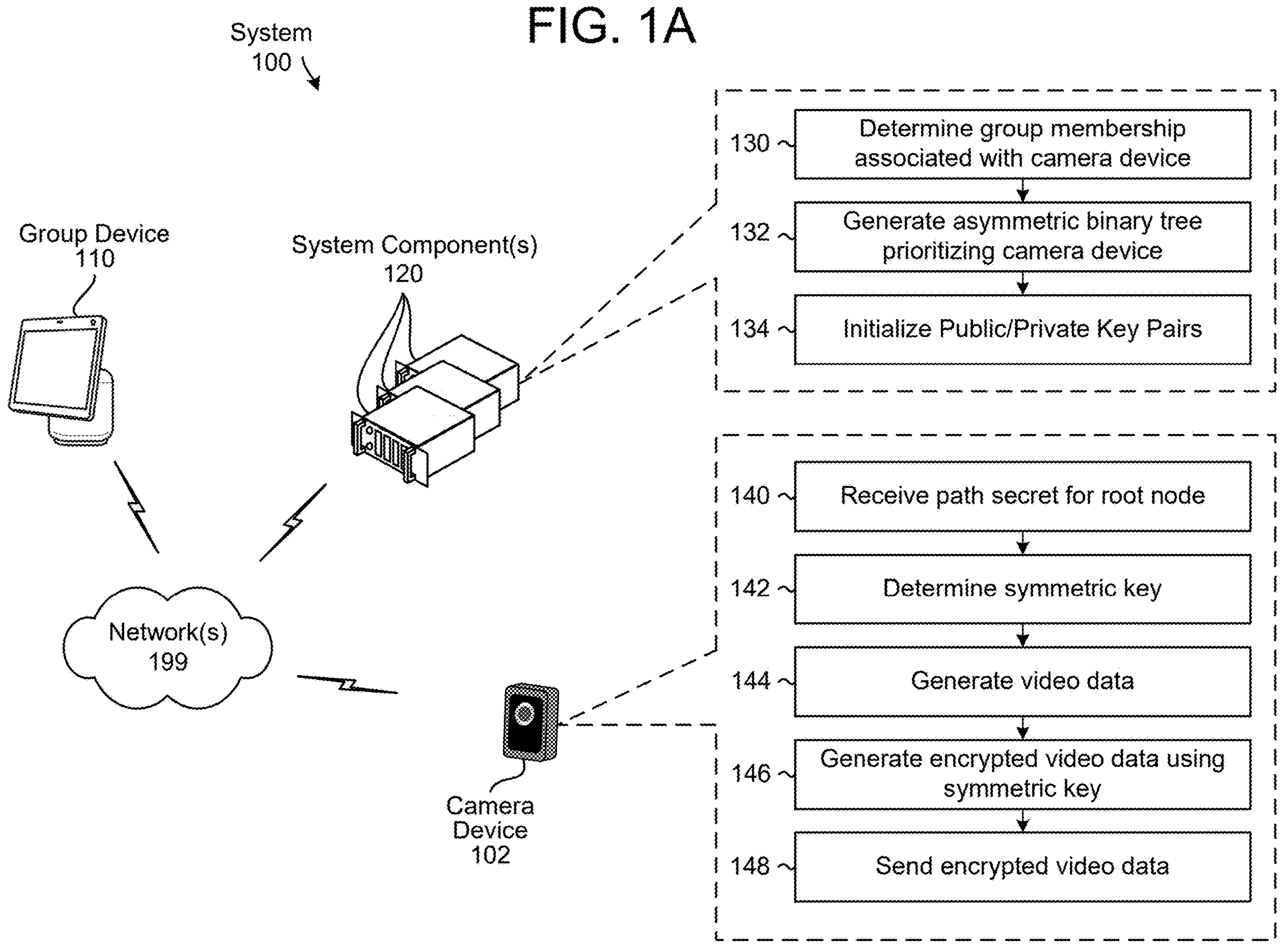
FIG. 1A
System 100
Group Device 110
System Component(s) 120
Network(s) 199
Camera Device 102
130 Determine group membership associated with camera device
132 Generate asymmetric binary tree prioritizing camera device
134 Initialize Public/Private Key Pairs
140 Receive path secret for root node
142 Determine symmetric key
144 Generate video data
146 Generate encrypted video data using symmetric key
148 Send encrypted video data

FIG. 1B

Encryption Architecture 200
Camera Device 102
System Component(s) 120
Cloud Encryption Proxy 220
Shared Resources 230
Message Delivery System 210
Database 215
Media Transport System 240
Encrypted Data 245
Group Devices 110

Initialization
400
Camera
Device
102
Group
Device
110
Step 1
Generate Asymmetric
Public/Private Key Pair
410a
Generate Asymmetric
Public/Private Key Pair
410b
Camera
Public Key
415b
Device
Public Key
415a

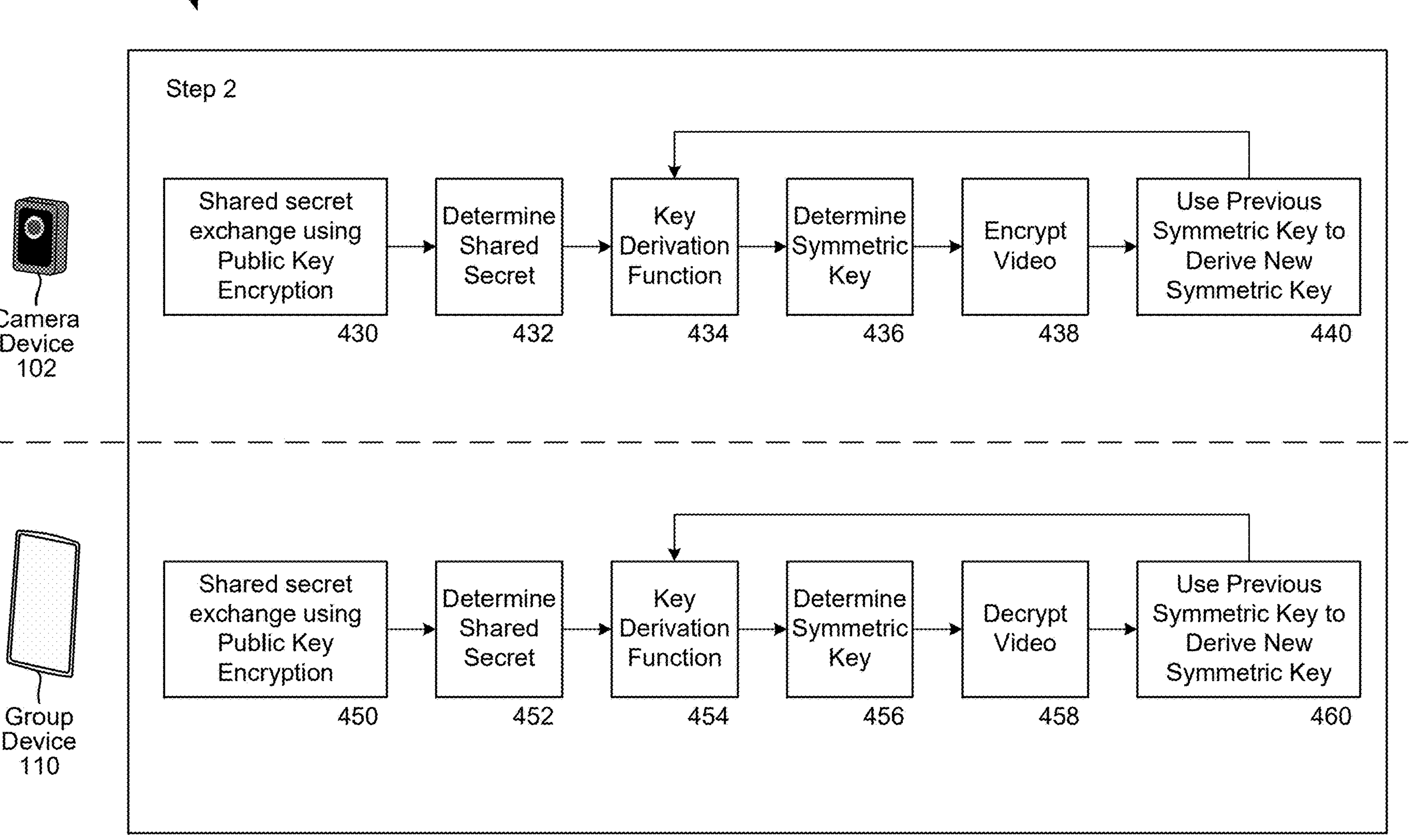
Synchronization
420
FIG. 4B
Step 2
Camera Device
102
Shared secret exchange using Public Key Encryption
430
Determine Shared Secret
432
Key Derivation Function
434
Determine Symmetric Key
436
Encrypt Video
438
Use Previous Symmetric Key to Derive New Symmetric Key
440
Group Device
110
Shared secret exchange using Public Key Encryption
450
Determine Shared Secret
452
Key Derivation Function
454
Determine Symmetric Key
456
Decrypt Video
458
Use Previous Symmetric Key to Derive New Symmetric Key
460

FIG. 5A
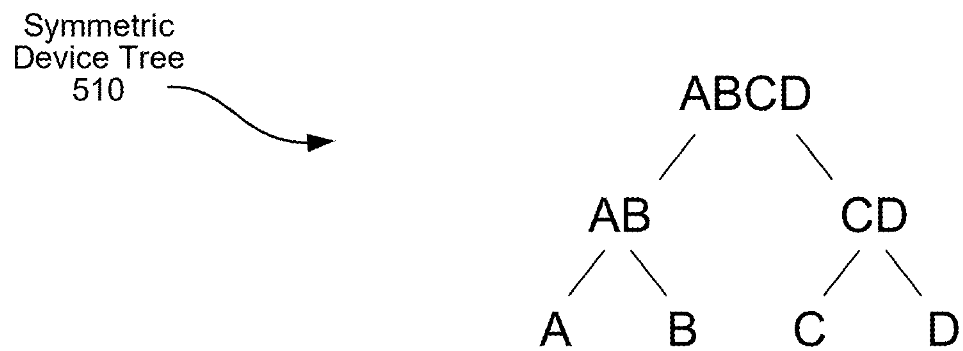
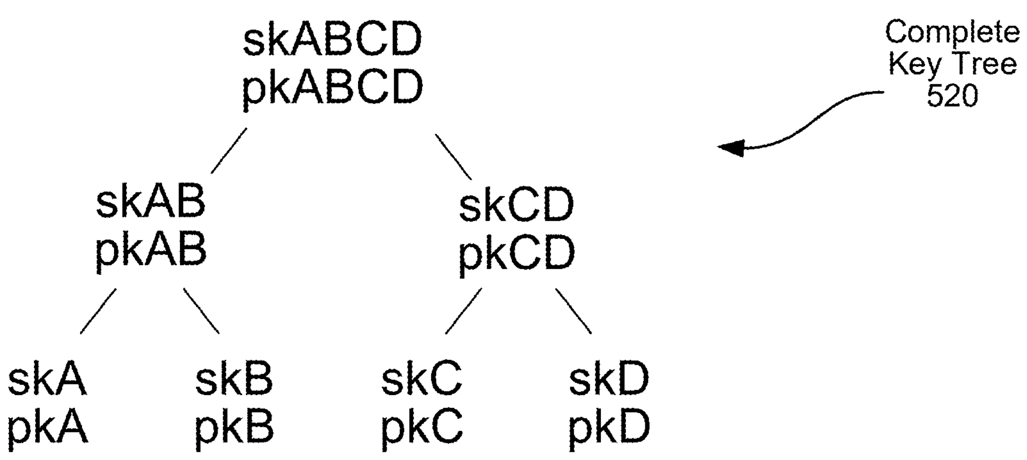
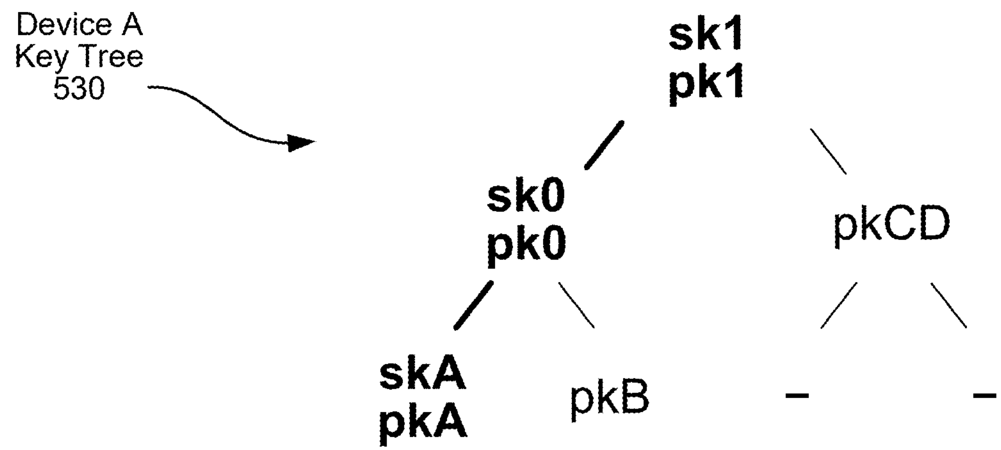

Adding Group Member 600
Group Devices 110
Admin Group Device 110a
New Group Device 110n
Cloud Encryption Proxy 220
Shared Resources 230
Message Delivery System 210
Database 215
System Component(s) 120
Camera Device 102
1
2
3
4
5
5
5
6
6
6
6

Group Devices 110
Admin Group Device 110a
Removed Group Device 110r
1
2
3
4
5
6
Shared Resources 230
Cloud Encryption Proxy 220
Message Delivery System 210
Database 215
System Component(s) 120
Removing Group Member 650
Camera Device 102

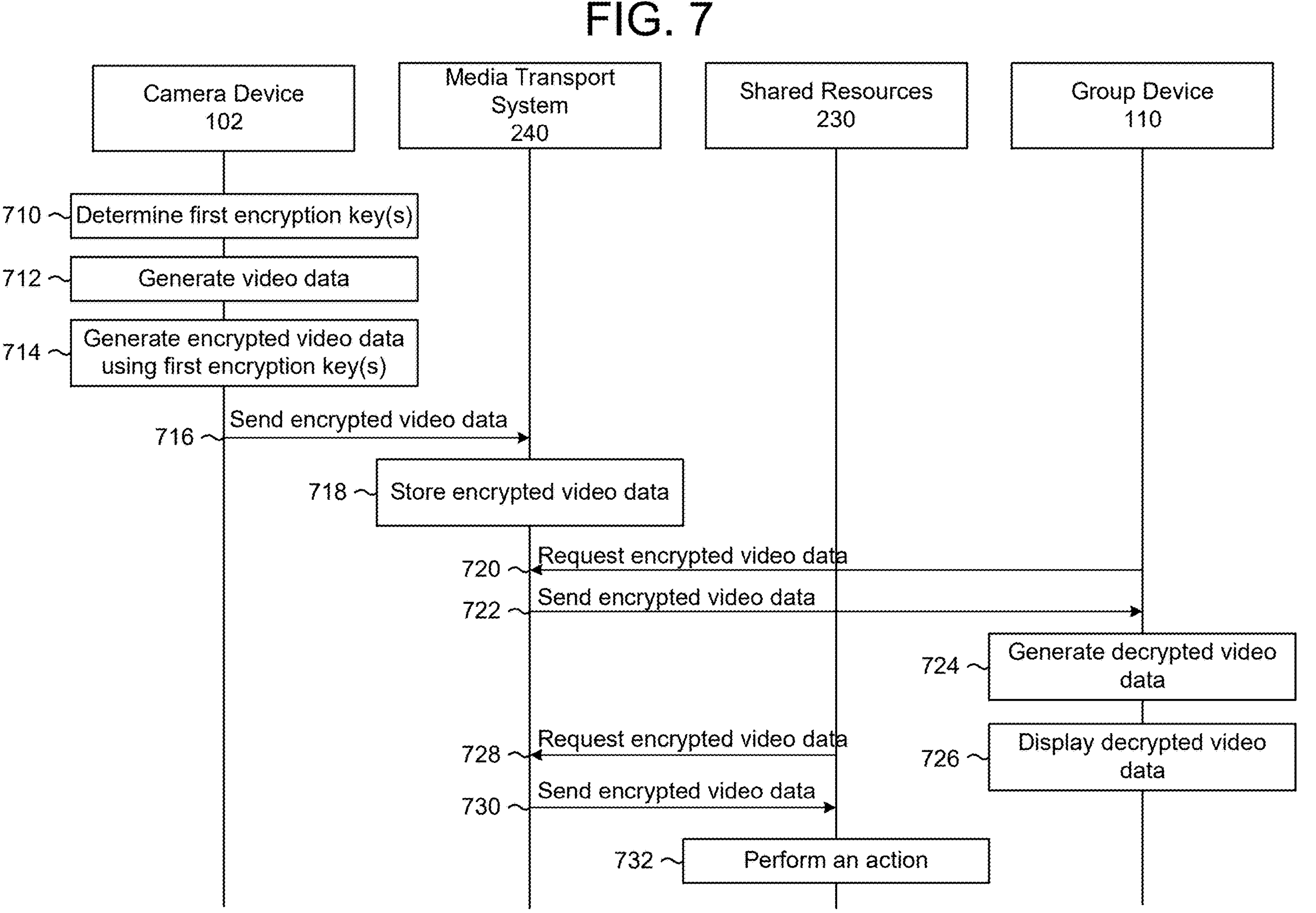
FIG. 7
Camera Device 102
Media Transport System 240
Shared Resources 230
Group Device 110
710 Determine first encryption key(s)
712 Generate video data
714 Generate encrypted video data using first encryption key(s)
716 Send encrypted video data
718 Store encrypted video data
720 Request encrypted video data
722 Send encrypted video data
724 Generate decrypted video data
728 Request encrypted video data
726 Display decrypted video data
730 Send encrypted video data
732 Perform an action Camera Device 102
Media Transport System 240
Shared Resources 230
810
Detect motion represented in video data
812
Send first encryption key(s)
814
Request encrypted video data
816
Send encrypted video data
818
Generate decrypted video data
820
Process decrypted video data to generate first data
822
Delete first encryption key(s)
824
Perform an action with first data

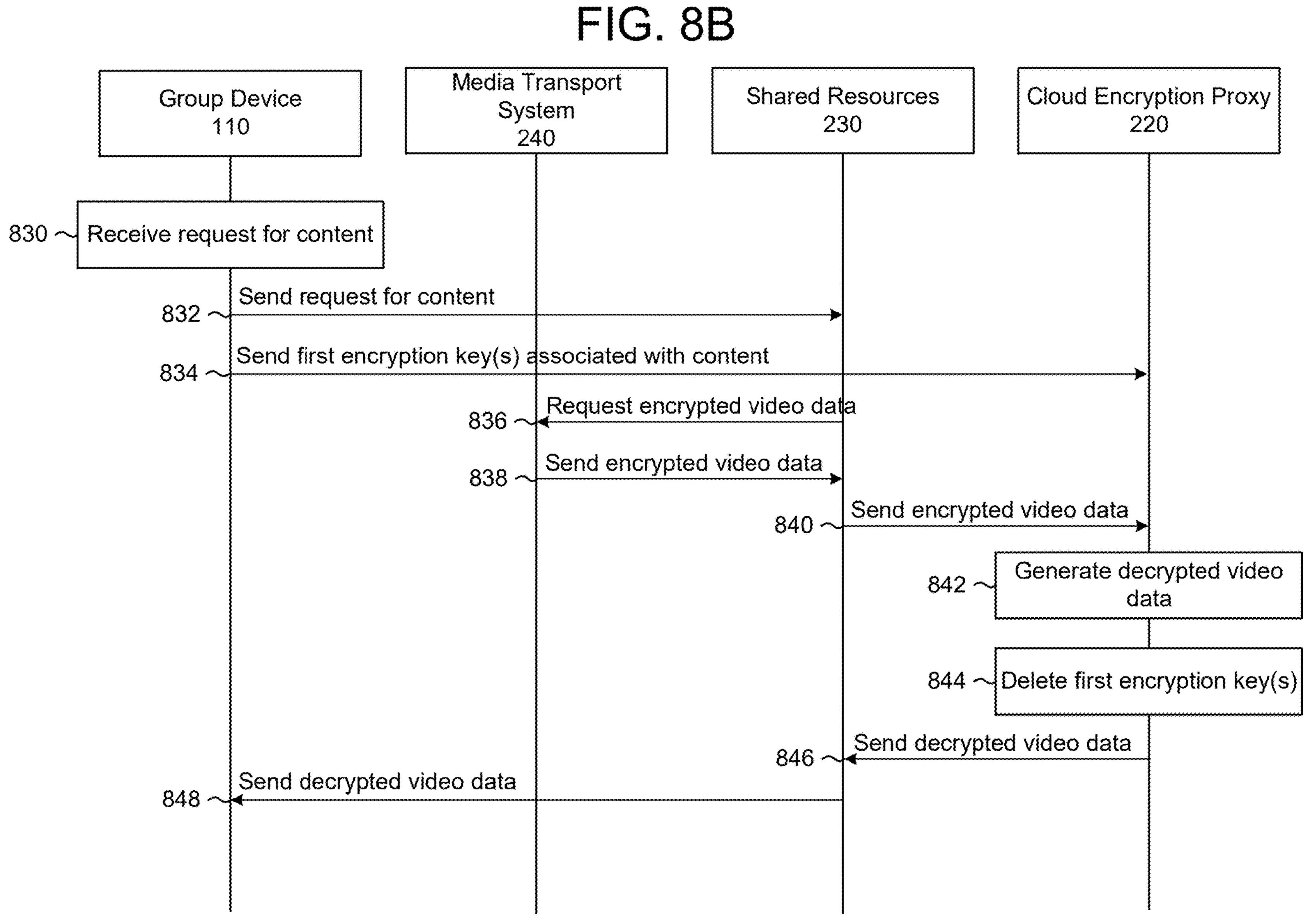
FIG. 8B
Group Device 110
Media Transport System 240
Shared Resources 230
Cloud Encryption Proxy 220
830
Receive request for content
832
Send request for content
834
Send first encryption key(s) associated with content
836
Request encrypted video data
838
Send encrypted video data
840
Send encrypted video data
842
Generate decrypted video data
844
Delete first encryption key(s)
846
Send decrypted video data
848
Send decrypted video data Network(s) 199
Camera Device 102
Antenna 914
Microphone(s) 920
Speaker 912
Camera 918
I/O Device Interfaces 902
Controller(s) / Processor(s) 904
Memory 906
Storage 908
Bus 924

FIG. 11

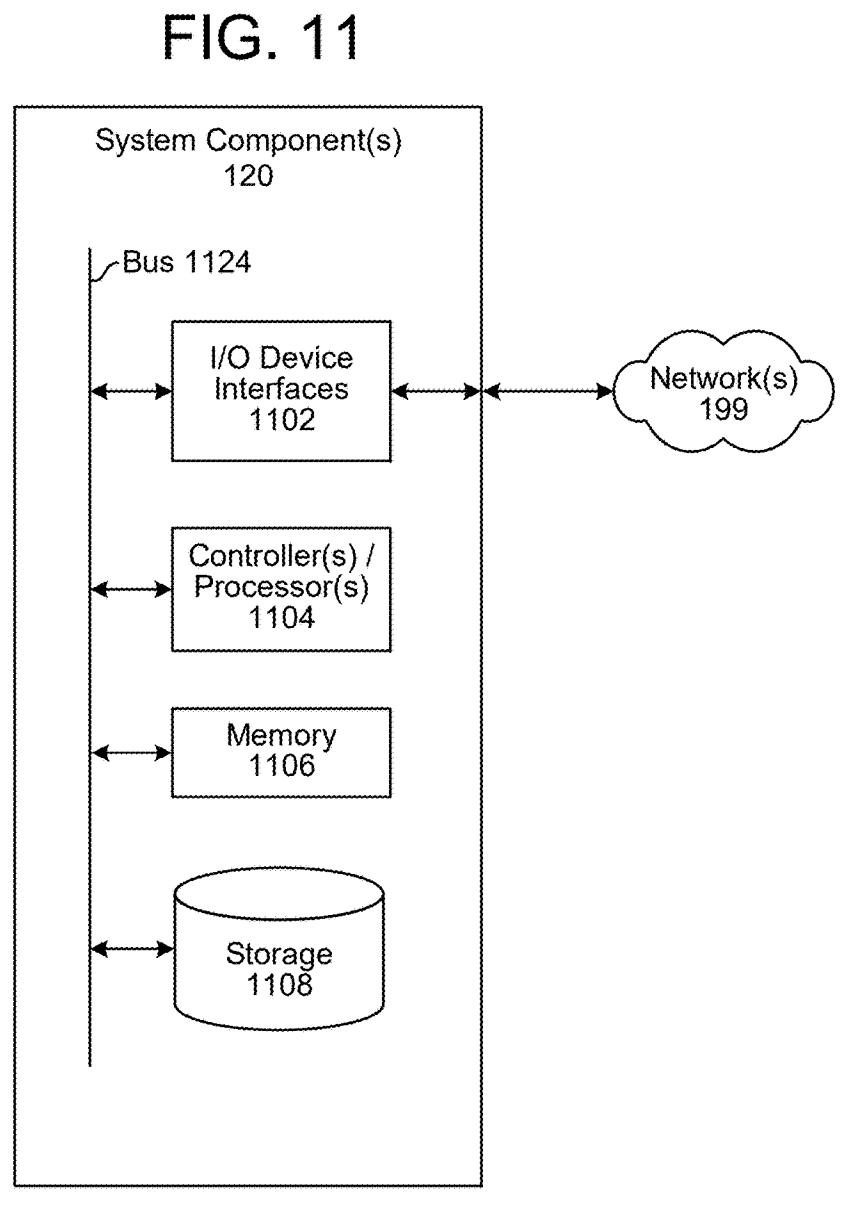

System Component(s)
120

Bus 1124

I/O Device Interfaces
1102

Controller(s) / Processor(s)
1104

Memory
1106

Storage
1108

Network(s)
199

GROUP ENCRYPTION USING UNBALANCED BINARY TREE ARCHITECTURE

BACKGROUND

Security camera devices and video doorbell devices commonly communicate recorded video to a cloud system, which in turn sends that content to a user device (e.g., a user's phone) for viewing. For security and privacy reasons, this video is generally encrypted, both when communicated from a camera device to the cloud, and when communicated from the cloud to a user device. Approaches exist in which end to end encryption is utilized, e.g., approaches where video is encrypted by a camera device and cannot be decrypted by a cloud service that handles communication to a user device, instead being decryptable only by the user device.

A classic problem in encryption is how to set up encrypted communications between two devices without a pre-existing shared secret when all that is available to set up the encryption is an unsecured channel. Various solutions are based on a classic key exchange approach often characterized as a Diffie-Hellman (or Diffie-Hellman-Merkle) key exchange approach.

In a classic implementation of such an approach, the modulo operation is utilized together with a jointly known modulus m and a jointly known base r. The value m is selected to be prime, and the base r is selected to be a primitive root modulo m.

For illustrative purposes, consider the overly simplistic example where modulus m is selected to be 7 and base r is selected to be 3 (which is a primitive root modulo 7).

Device a selects a secret value a=2, and then determines A=r^a mod m, here A=3^2 mod 7=2. Device b selects a secret value b=3, and then determines B=r^b mod m, here B=3^3 mod 7=6.

Device a sends A to device b, and device b sends B to device a. Device a then uses the received value B to determine sa=B^a mod m, here sa=6^2 mod 7=1. Device b uses the received value A to determine sb=A^b mod m, here sb=2^3 mod 7=1. Importantly, sa will always equal sb, because (r^a mod m) ^b mod m=(r^b mod m) ^a mod m, and thus the two devices have determined a shared secret (here, the number 1). Admittedly, in this instance, this is not a very distinctive secret, which is why this is an overly simplistic example. In more practical uses, much larger values of a, b, and m are generally utilized (although small values of r are often utilized). The security of such a solution comes from the difficulty in solving for the value of a, given r, m, and r^a mod m, when a large prime number (e.g. greater than 600 digits) is utilized for m.

Approaches also exist that, rather than being based on the modulo operation, are instead based on the algebraic structure of elliptic curves over finite fields. An elliptic curve can be defined as a plane curve over a finite field which consists of: the points (x,y) satisfying y^2=x^3+ax+b, and a distinguished point at infinity i. The security of such approaches comes from the difficulty in finding the discrete logarithm of a random elliptic curve element with respect to a publicly known base point.

In such a case, rather than starting with a jointly known modulus m and base r, devices instead start with jointly known domain parameters. The size of the finite field generally is a prime p or a power of two in the form of 2^m. Where the size of the field is a power of two, this is generally characterized as a binary case, and requires an auxiliary curve f. In the prime case, the field is simply defined by prime p, while in the binary case the field is defined by m and f. The elliptic curve to be used is defined by the constants a and b (y^2=x^3+ax+b). The cyclic subgroup is defined by its generator (a.k.a. base point) G.

Device a selects a random integer from the interval [1, n−1], where n is the order of the subgroup. This random integer can be used as a secret or private key secret_key_a. Device a then determines, based on the random integer representing the private key secret_key_a, a point representing a public key public_key_a, e.g. (public_key_ax, public_key_ay). Specifically, device a determines the point by multiplying the random integer by the base point of the subgroup, i.e. public_key_a=secret_key_a*G.

Similarly, device b selects a random integer representing a private key secret_key_b from the interval [1, n−1], where n is the order of the subgroup. Device b then determines, based on the random integer representing the private key secret_key_b, a point representing a public key public_key_b, e.g. (public_key_bx, public_key_by). Specifically, device b determines the point by multiplying the random integer by the base point of the subgroup, i.e. public_key_b=secret_key_b*G.

Device a sends public_key_a, i.e. (public_key_ax, public_key_ay) to device b, and device b sends public_key_b, i.e. (public_key_bx, public_key_by) to device a. Device a uses the received point public_key_b to determine a secret secret_key_ab_a, e.g. secret_key_ab_a=secret_key_a*public_key_b. Device b uses the received point public_key_a to determine a secret secret_key_ab-b, e.g. secret_key_ab_b=secret_key_b*public_key_a. Importantly, secret_key_ab_a will always equal secret_key_ab_b. This can clearly be seen in that secret_key_a*(public_key_b)=secret_key_a*(secret_key_b*G), and secret_key_b*(public_key_a)=secret_key_b*(secret_key_a*G); thus, because secret_key_a*(secret_key_b*G)=secret_key_b*(secret_key_a*G), secret_key_a*(public_key_b)=secret_key_b*(public_key_a).

Accordingly, the determined secret_key_ab_a and secret_key_ab_b points actually represent a shared secret point, S (which can be represented simply as shared_key_ab). This shared secret point S can now be used by device a and device b for communications therebetween. For example, a value for the x coordinate of S can be used to encrypt messages (e.g. as a symmetric key or to generate a symmetric key).

Either approach can be represented as use of one or more functions, algorithms, or operations to determine a public key based on a known private key, and then determine a shared key based on a known private key and a received public key from another device.

For example, a first function determinePubKey( ) may take as input a private key and return a public key determined based thereon, e.g. public_key_a=determinePubKey(secret_key_a). Alternatively, a function genKeyPair( ) may generate and return a public-private key pair, e.g. genKeyPair( ) may return public_key_a and secret_key_a. For example, a genKeyPair( ) function may itself just generate a random secret for use as a private key and then call a determinePubKey( ) function with the secret as an input or perform the equivalent operations.

The public-private key pair may be a secret value a representing the private key secret_key_a and a value A determined based thereon (e.g. A=r^a mod m) representing a public key public_key_a. Returning to the simplistic example above where the modulo operation is utilized together with a jointly known modulus m and a jointly known base r, after device a selects a secret value a=2, it could call a function determinePubKey(secret_key_a) which would determine A=r^secret_key_a mod m, here A=3^2 mod 7=2, and return this determined value A=2 as public_key_a.

The pair may be a random integer representing the private key secret_key_a and a point representing a public key public_key_a, e.g. (public_key_ax, public_key_ay). Returning to the example above based on the algebraic structure of elliptic curves over finite fields, after device a selects a random integer representing a private key secret_key_a from the interval [1, n−1], where n is the order of the subgroup, it could call a function determinePubKey(secret_key_a) which would determine a point to be returned as public_key_a (e.g. public_key_ax, public_key_ay) by multiplying the random integer representing the private key provided as input (secret_key_a) by the base point of the subgroup, i.e. public_key_a=secret_key_a*G, and return this determined point (or a value determined based thereon, e.g. an x coordinate of the point) as public_key_a.

Determination of a public-private key pair may be based on a scheme where the modulo operation is utilized together with a jointly known modulus m and a jointly known base r, a scheme based on the algebraic structure of elliptic curves over finite fields, or a similar suitable scheme, etc.

Device b may similarly determine a public-private key pair, e.g. a public key public_key_b and a corresponding private key secret_key_b. The devices may then send to one another their public keys, e.g. device a sends public_key_a and device b sends public_key_b.

Each device then uses a known function, algorithm, or operation (e.g. determineSharedSecret( ) to determine a shared secret.

Returning again to the simplistic example where the modulo operation is utilized together with a jointly known modulus m and a jointly known base r, after device a receives public_key_b from device b, it could call a function determineSharedSecret(secret_key_a, public_key_b) which would use the received value public_key_b to determine secret=public_key_b^secret_key_a mod m, here secret=6^2 mod 7=1.

Returning again to the example based on the algebraic structure of elliptic curves over finite fields, after device a receives public_key_b from device b, it could call a function determineSharedSecret(secret_key_a, public_key_b) which would use the received point public_key_b to determine secret=secret_key_a*public_key_b.

Thus, device a determines secret=determineSharedSecret (secret_key_a, public_key_b), and device b determines secret=determineSharedSecret(secret_key_b, public_key_a).

Secret may then be used as a shared symmetric key, or may be used to determine or generate a shared symmetric key (e.g. an x coordinate of a point representing the shared secret may be used as a symmetric key).

This type of approach can be (and sometimes is) used to set up encrypted communications for larger groups of devices (e.g. three or more devices) by simply determining such a shared symmetric key for each pair of two devices. For example, given three devices: device a, device b, and device c, one approach might be to determine a shared key for device a and device b (shared_key_ab), a shared key for device a and device c (shared_key_ac), and a shared key for device b and device c (shared_key_bc). However, when a device needs to send a message to n devices, this requires encryption with a separate key for each device, resulting in a cost of O(n).

An alternative approach that is sometimes used to send a message to multiple recipients involves generating a new key that can be used as a symmetric key, encrypting the message with that new symmetric key, encrypting that symmetric key with a respective public key for each recipient, and then sending each recipient the respective encrypted version of the newly generated symmetric key that was encrypted with their respective public key. For example, device a might encrypt a newly generated symmetric key (e.g. a newly generated random or pseudo-random number or value) with a public key for device b (and send it to device b), and encrypt the symmetric key with a public key for device c (and send it to device c). Thus, when a device needs to send a message to n devices, the cost of encryption for the message is O(1) (because all messages can be encrypted with the same symmetric key), but the cost of encryption for the symmetric key is still O(n).

More complex approaches may involve use of a key derivation function that generates a sequence or chain of keys based on an initial key. For example, a key derivation function kdf( ) with an input of initial_key might generate kdf(initial_key)=derived_key_1. Key derivation function kdf( ) can then be used again with derived_key_1 as an input to generate derived_key_2, e.g. kdf(derived_key_1)=derived_key_2. That is, derived_key_2=kdf(kdf(initial_key)). In this way, by starting with an initial key as an input to a key derivation function and then repeatedly using the output derived key as an input to the key derivation function, a sequence or chain of derived keys can be generated from an initial key.

In a multi-device context, this allows a device a to send an initial key key_a to other devices (encrypting that key with a respective public key for each recipient), and then use this initial key as an input to a key derivation function to derive a sequence of private keys (e.g. derived_key_a1=kdf (key_s), derived_key_a2=kdf(derived_key_a1)=kdf(kdf (key_s)), etc.). These private keys can be used to encrypt messages from device a. Other devices that have received the initial key key_a from device a can use the key derivation function and key_a to generate private keys for use in decrypting messages encrypted by a (e.g. derived_key_a1=kdf(key_s), derived_key_a2=kdf (derived_key_a1)=kdf(kdf(key_s)), etc.) Thus, when a device needs to send a message to n devices, the cost of encryption for the message is O(1), but the cost of encryption when sending an initial key or when updating an initial key is still O(n). Messages may also be signed with a signing key (e.g. generated at the same time as an initial key) to guard against impersonation of a device by another device that knows its initial key (e.g. key_a).

Some complex encryption approaches may involve use of a key encapsulation mechanism (KEM), which might include an encapsulation algorithm or function (e.g. enc( ) and a decapsulation algorithm or function (e.g. dec( ). An encapsulation function might take a public key for another device as an input and return a symmetric key and a ciphertext that can be used by the another device (using the corresponding private key) to determine the symmetric key. It will be appreciated that this is a variation on the classic Diffie-Hellman (or Diffie-Hellman-Merkle) key exchange approach.

For example, consider a device b that has a public-private key pair comprising secret_key_b and public_key_b. Device a knows the public key public_key_b and wants to generate a shared secret for use with device b. An encapsulation function enc( ) can be used that generates a random integer a and determines a shared secret k and a ciphertext c that can be sent to device b. For example, calling enc(public_key_b) may return shared secret k and ciphertext c, where k=determineSharedSecret(a, public_key_b) and c=determinePublicKey(a). When device b receives ciphertext c, the decapsulation function dec( ) can be used with the private key secret_key_b and the ciphertext c as inputs to determine the shared secret k. For example, calling dec (secret_key_b, c) may return shared secret k, which is determined based on k=determineSharedSecret (secret_key_b, c). It will be appreciated that this can be characterized as a variation on or flavor of Diffie-Hellman, with a being characterized as a private key and c being characterized as a public key determined based on the private key.

In some approaches, it may be desirable to use a shared secret or shared symmetric key as a private key for which a corresponding public key can be generated. An integerization function, operation, or algorithm int( ) may be utilized to deterministically determine an integer value based on an input shared secret or input shared symmetric key, e.g. int(secret) or int(shared_secret_key). This determined integer value can then be used to determine a corresponding public key, e.g. shared_public_key=determinePublicKey(int (shared_secret_key)). For example, a shared secret known at device a and device b can be used at each device to determine a shared private key shared_secret_key_ab (e.g. determined as the x coordinate of a point represented by the shared secret), and this shared private key can then be used to determine a shared public key shared_public_key_ab, e.g. shared_public_key_ab=determinePublicKey(int (shared_secret_key_ab)). This shared public key shared_public_key_ab can then be shared with other devices and used by other devices to encrypt a message that can be decrypted by either device a or device b using shared_secret_key_ab.

Such shared public and private keys can be used with a binary tree approach to group encryption where each leaf node represents a key (e.g. a key for a particular device) and each non-leaf node represents a key that is known by all descendants of that node. Each leaf node may be associated with a device or user. Each device or user corresponding to a leaf node should know the private key for each node between itself and the root, and should know the public key for each node immediately descendent from a node for which it knows the private key (because these nodes are necessary to compute the private keys it needs to know), but may not know public or private keys for other nodes.

Consider a very simple example with device a, device b, device c, and device d, where device a and device b are leaf nodes joined at a parent node ab, and device c and d are leaf nodes joined at a parent node cd, with the root corresponding to abcd. Device a knows its private key secret_key_a, and receives a public key for device b, public_key_b. Using these, device a can determine a shared secret key, e.g. secret_key_ab=determineSharedSecret(secret_key_a, public_key_b). Device b similarly knows its private key secret_key_b, and receives a public key for device a, public_key_a. Using these, device b can also determine the shared secret key secret_key_ab. In the same manner, device c and device d can each determine their own shared secret key secret_key_cd.

Any of these devices can also determine a shared public key corresponding to its shared secret key, e.g. public_key_ab=determinePublicKey(secret_key_ab) or public_key_ab=determinePublicKey(int(secret_key_ab)). These shared public keys can be shared with the appropriate devices/users/nodes, e.g. public_key_ab can be shared with device c and device d and public_key_cd can be shared with device a and device b.

Device a and device b can each then, for example, determine a shared secret key for all of the nodes, secret_key_abcd, using secret_key_ab and public_key_cd, e.g. secret_key_abcd=determineSharedSecret (secret_key_ab, public_key_cd), or possibly secret_key_abcd=determineSharedPrivateKey(determineSharedSecret(secret_key_ab, public_key_cd)). Similarly, device c and device d can each determine the shared secret key for all of the nodes, secret_key_abcd, using secret_key_cd and public_key_ab.

This same approach operates for each level of larger trees. For example, if there is another branch corresponding to device e, device f, device g, and device h, then a public key public_key_abcd may need to be generated (e.g. public_key_abcd=determinePublicKey(secret_key_abcd) or possibly public_key_abcd=determinePublicKey(int (secret_key_abcd))) and provided to device e, device f, device g, and device, so they may use it to determine secret_key_abcdefgh, e.g. secret_key_abcdefgh=determineSharedSecret(secret_key_abcd, public_key_efgh).

Generally, the depth of the tree is log n, where n is the number of devices/users/keys/keyholders/etc. When a device/user/etc. updates their private key, only log N nodes must be modified/updated, e.g. those on the path from the device's leaf node to the root.

This type of simplistic approach utilizing binary trees has been expanded upon to develop approaches utilizing a key encapsulation function and a key derivation function, where each node can include a private key, a public key, and a hash with information about the node's parent.

For example, the Messaging Layer Security (MLS) protocol uses a binary ratchet tree approach to group encryption where each leaf node is associated with a group member (e.g. a particular device) and each non-leaf node includes a public and private key pair, where the private key is known by all descendants of that node. When it comes time to update keys (e.g. based on new randomness), a device corresponding to a node generates a new random secret and then determines a sequence of secrets based thereon, with each secret in the sequence corresponding to a node along the path from its node to the root. Each of these secrets is used to determine a public-private key pair for that node. A secret corresponding to the root needs to be known by all members of a group, and is used to generate encryption keys that can be used to encrypt messages between group members.

An exemplary approach will now be described which utilizes a key encapsulation function and a key derivation function, where each node can include a private key, a public key, and a hash with information about the node's parent.

The key derivation function takes as input a key or secret and a label or keyword value, e.g. kdf(secret, "path"). The key derivation function is utilized to determine, based on an initial secret initial_secret (which may be a newly generated random value, point, etc.), a sequence of path secrets path_secret_1, path_secret_2, . . . path_secret_n for each path step from a leaf node to the root, e.g. path_secret_1=kdf (initial_secret, "path"), path_secret_2=kdf(path_secret_1, "path")=kdf(kdf(initial_secret, "path")), etc.

The path secret for a node along the path is used to generate a node secret for that node using the same key derivation function, e.g. node_secret_1=kdf(path_secret_1, "node"), node_secret_2=kdf(path_secret_2, "node"), etc., where for example node 1 might correspond to the parent of a node that is updating the tree, node 2 might correspond to the parent of node 1, etc. A node secret for the leaf itself can also be generated, e.g. leaf_secret=kdf(initial_secret, "node"), where leaf_secret can also be characterized as node_secret_0.

A key encapsulation mechanism is used to generate, for each respective node along the path based on the respective generated node secret for that respective node, a new public-private key pair, e.g. genKeyPair(node_secret_1) returns private key secret_key_1 and public key public_key_1 determined based thereon. A new public-private key pair can similarly be determined for the leaf node itself, e.g. with leaf_secret=kdf(initial_secret, "node") and with genKeyPair (leaf_secret) returning private key secret_key_leaf and public key public_key_leaf (which may also be characterized as secret_key_0 and public_key_0). The device or user corresponding to the leaf node will then cause sending of update messages to other devices and users corresponding to other leaf nodes. Specifically, for each respective node, a leaf node will need to know the new path secret for that respective node if that respective node is in its path to the root, and will otherwise at most need to know the public key.

For example, returning to the simplistic example of a tree with leaf nodes corresponding to device a, device b, device c, and device d, an update by device a would involve generating a new initial secret initial_secret, and then determining path secret path_secret_1 for the parent node of device a and device b (which can be characterized as node ab), e.g. path_secret_1=kdf(initial_secret, "path"). It would further involve determining path secret path_secret_1 for the parent node of node ab (which can be characterized as node abcd), e.g. path_secret_2=kdf(path_secret_1, "path") or path_secret_2=kdf(kdf(initial_secret, "path")).

As described above, the path secret for a node along the path is used to generate a node secret for that node using the same key derivation function, e.g. node_secret_1=kdf (path_secret_1, "node") generates a node secret for node ab, node_secret_2=kdf(path_secret_2, "node") generates a node secret for node abcd. Similarly, the initial secret initial_secret generated by device a is used to generate a node secret for the leaf node corresponding to device a (which can be characterized as node a), e.g. leaf_secret=node_secret_0=kdf(initial_secret, "node") generates a node secret for node a.

A key encapsulation mechanism is used to generate, for each respective node along the path based on the respective generated node secret for that respective node, a new public-private key pair for that respective node, e.g. genKeyPair (node_secret_1) returns private key secret_key_1 and public key public_key_1 determined based thereon, which correspond to node ab. Similarly, genKeyPair(node_secret_2) returns private key secret_key_2 and public key public_key_2 determined based thereon, which correspond to node abcd.

A new public-private key pair is similarly determined for the leaf node itself (node a), e.g. genKeyPair(leaf_secret) returns private key secret_key_leaf and public key public_key_leaf, which may also be characterized as secret_key_0 and public_key_0.

As noted above, a leaf node will need to know the new path secret for a respective node if that respective node is in its path to the root, and will otherwise at most need to know the public key. Thus, device a will cause sending of the newly generated path secret path_secret_1 (corresponding to node ab) to device b in order to enable device b to generate the necessary keys (e.g. generate, in the same manner as device a, private key secret_key_1 and public key public_key_1 corresponding to node ab, and private key secret_key_2 and public key public_key_2 corresponding to node abcd). On the other hand, device a only needs to cause sending of public_key_1 (corresponding to node ab) to device c and device d in order to enable these devices to generate the necessary keys, e.g. generate private key secret_key_2 and public key public_key_2 corresponding to node abcd.

For encrypted communications, encryption keys are derived using a key schedule based on the node secret for the root node, e.g. node_secret_2 corresponding to root node abcd, which can be characterized as a commit secret.

This commit secret is used to generate a tree of secrets with the same structure as the binary tree corresponding to the devices/users/etc., which can be characterized as a ratchet tree. Each leaf of the secret tree is associated with the same device/user/etc. as the corresponding leaf of the ratchet tree.

Returning to the simple example above, the secret tree can be derived top-down based on the node secret node_secret_2 corresponding to root node abcd, with a secret tree node secret for child nodes being determined based on the secret tree node secret for the parent node. For example, secretTree_node_secret_abcd corresponding to root node abcd would be equal to node_secret_2, and based thereon secret tree node secrets for its two child nodes (corresponding to node ab and node cd) would be determined, e.g. secretTree_node_secret_ab=determineChildSecret (secretTree_node_secret_abcd, left), secretTree_node_secret_cd=determineChildSecret (secretTree_node_secret_abcd, right), secretTree_node_secret_a=determineChildSecret (secretTree_node_secret_ab, left), etc. In this way, a secret tree node secret is generated for each leaf node corresponding to a device/user/etc.

The respective secret tree node secret for each leaf of the secret tree is used as the first element to derive a sequence or chain of secret tree node secrets for that node, e.g. secretTree_node_secret_a_1 deriveSecret(secretTree_node_secret_a, "secret"), secretTree_node_secret_a_2=deriveSecret(secretTree_node_secret_a_1, "secret"), etc. Each element in the chain or sequence can be characterized as corresponding to a ratchet position or ratchet generation.

The term authenticated encryption is often used to refer to an encryption scheme which ensures that an encrypted message is impossible to understand without a key, and also includes authentication data (e.g. an authentication tag or value) that the sender of the encrypted message can calculate only with the key. Such a scheme may allow a message to contain associated data which may not be encrypted, but where tampering or editing of the associated data will be detected. Such a scheme is often characterized as an authenticated encryption with associated data (AEAD) scheme.

For each ratchet position for each node, an AEAD encryption key and nonce can be generated, e.g. secretTree_node_secret_a_1_nonce=deriveSecret (secretTree_node_secret_a_1, "nonce"), secretTree_node_secret_a_1_key=deriveSecret (secretTree_node_secret_a_1, "key"), etc. Each key and nonce is used only once and deleted thereafter once no longer needed.

BRIEF DESCRIPTION OF DRAWINGS

For a more complete understanding of the present disclosure, reference is now made to the following description taken in conjunction with the accompanying drawings.

FIG. 1A illustrates a system configured to perform encryption using an embedded camera device according to embodiments of the present disclosure.

FIG. 1B illustrates a system having binary tree architecture and configured to perform decryption according to embodiments of the present disclosure.

FIGS. 4A-4B illustrate examples of initialization and synchronization of encryption keys according to embodiments of the present disclosure.

FIGS. 5A-5B illustrate examples of symmetric and asymmetric binary trees according to embodiments of the present disclosure.

FIG. 7 is a network communication diagram illustrating an example of generating and accessing encrypted video data according to embodiments of the present disclosure.

FIGS. 8A-8C are network communication diagrams illustrating examples of decrypting encrypted video data according to embodiments of the present disclosure.

FIG. 11 is a block diagram conceptually illustrating example components of a remote system according to embodiments of the present disclosure.

DETAILED DESCRIPTION

Figure 2:
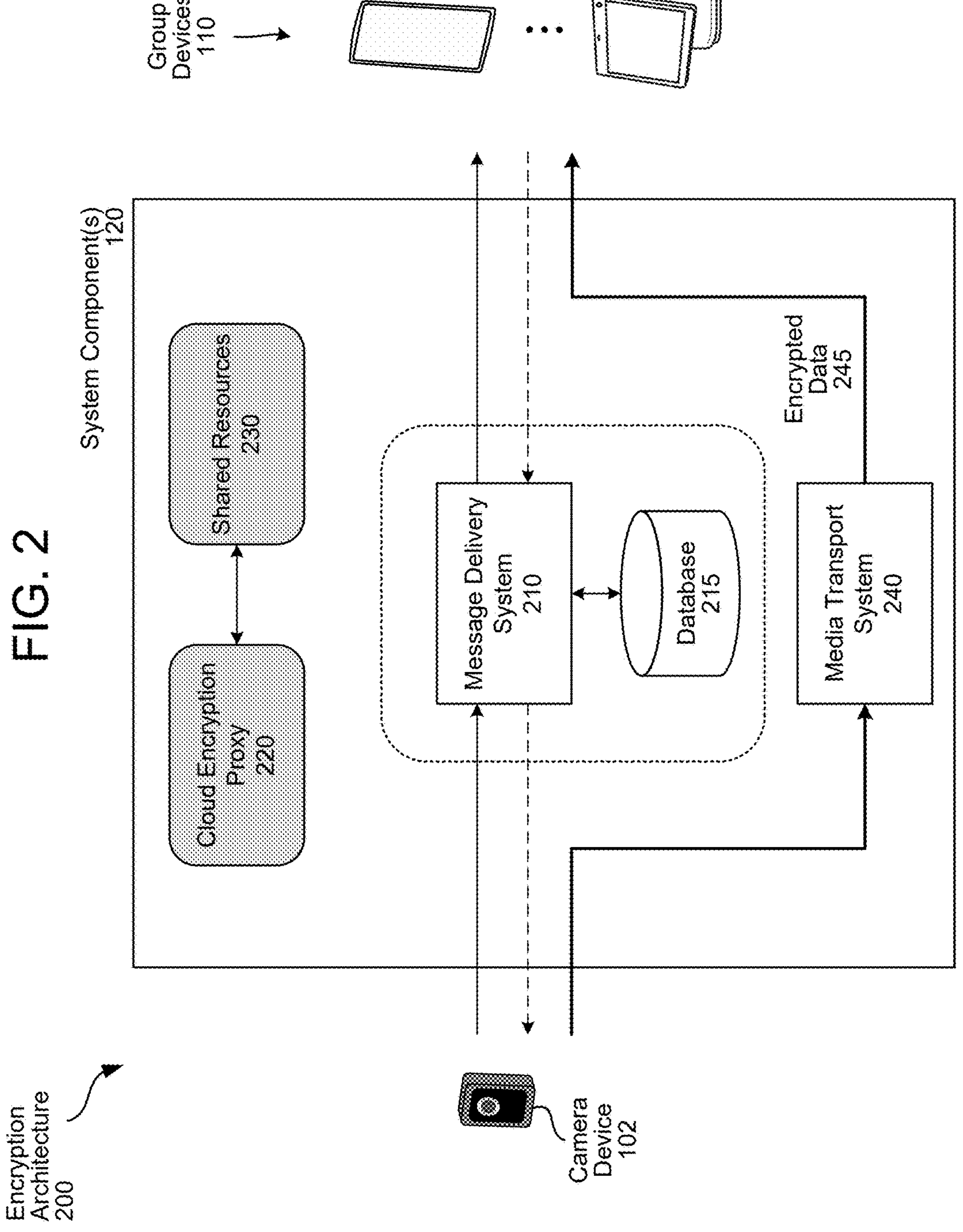
FIG. 2 illustrates an example of encryption architecture according to embodiments of the present disclosure.

Electronic devices may be used to capture audio/video and process audio data and/or image data. The audio data and/or image data may be used as part of a security system (e.g., detecting motion and/or movement), may be sent to a remote device as part of a communication session, and/or the like. To enhance privacy protection and/or security, the audio data and/or image data may be encrypted to prevent unauthorized access to the video. For example, only devices with explicit authorization from a user profile may be able to decrypt the encrypted data. However, limiting and/or revoking authorization is a challenge for existing encryption systems, as there is a direct tradeoff between accessibility and privacy protections. For example, granting access by an existing encryption system may grant access to all previous and future videos, without granular control over a scope of access (in time and volume). Providing that granular control, however, increases a complexity and an amount of processing for individual devices.

To improve encryption architecture for camera video data, devices, systems and methods are disclosed that utilizes an unbalanced binary tree architecture. By using an unbalanced tree architecture that prioritizes a constrained device (e.g., embedded camera device), the system reduces an amount of processing required for the constrained device to encrypt video data. For example, placing the constrained device near the root of the unbalanced binary tree offloads processing from the constrained device to other group members. At each device operating as a member of the group, a privacy enforcement policy operates to authorize/authenticate messages, using time-sensitive encryption keys that enable refined control over decrypted content. In some examples, the architecture can enable end-to-end encryption by removing any cloud services from the group. Alternatively, the architecture can include a cloud service with high or low privileges, enabling refined control over decrypted content while providing additional functionality.

Figure 1B:
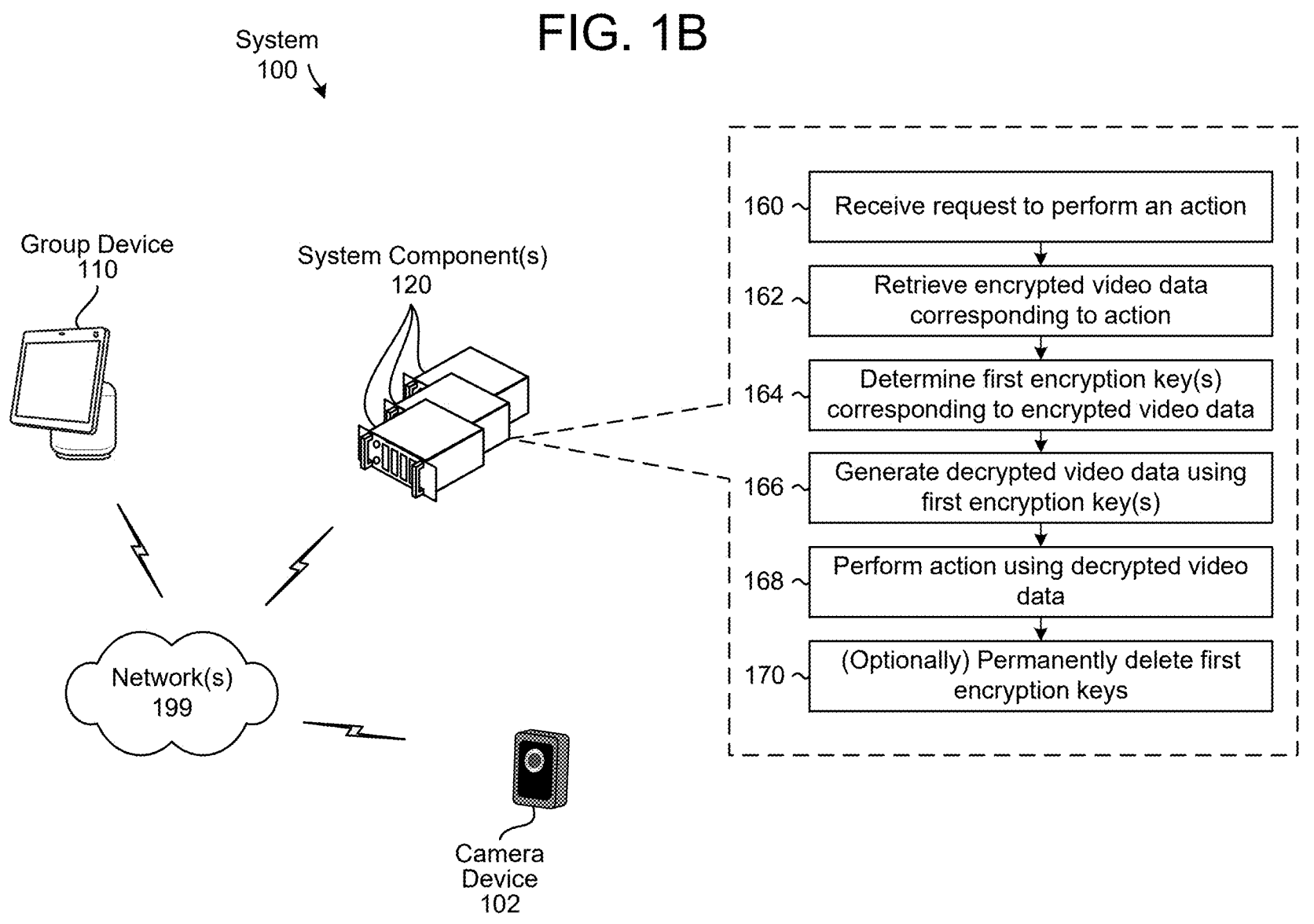

FIG. 1A illustrates a system configured to perform encryption using an embedded camera device according to embodiments of the present disclosure. Although FIGS. 1A-1B, and other figures/discussion illustrate the operation of the system in a particular order, the steps described may be performed in a different order (as well as certain steps removed or added) without departing from the intent of the disclosure. As illustrated in FIG. 1A, the system 100 may include a camera device 102, a group device 110, and/or system component(s) 120 that may be communicatively coupled to network(s) 199.

As will be described in greater detail below, FIG. 1A illustrates an example of the system component(s) 120 initializing a group of devices to enable group encryption. In some examples, the system component(s) 120 may initialize the group by exchanging public keys with the camera device 102 and enable the camera device 102 to encrypt video data. However, the disclosure is not limited thereto, and in other examples the group device 110 may initialize the group by exchanging public keys with the camera device 102 without departing from the disclosure.

In some examples, the camera device 102 may be an electronic device configured to capture audio data and/or image data. For example, the camera device 102 may include a camera or image sensor configured to generate image data that captures input video, although the disclosure is not limited thereto. In some examples, the camera device 102 may include a microphone array configured to generate microphone audio data that captures input audio, although the disclosure is not limited thereto and the device 110 may include multiple microphones without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data. Whether the microphones are included as part of a microphone array, as discrete microphones, and/or a combination thereof, the device 110 may generate the microphone audio data using multiple microphones. For example, a first channel of the microphone audio data may correspond to a first microphone (e.g., k=1), a second channel may correspond to a second microphone (e.g., k=2), and so on until a final channel (K) corresponds to final microphone (e.g., k=K).

In some examples, the audio data may be included as part of the image data, such that the image data may include a representation of images and audio captured by the camera device 102 without departing from the disclosure. The disclosure is not limited thereto, however, and in other examples the image data may only include a representation of images captured by the camera device 102. For ease of illustration, reference to video, video data, image data, and/or the like may refer to either video or a combination of audio/video interchangeably without departing from the disclosure.

In some examples, the camera device 102 may be a security camera and the system 100 may be configured to enable a persistent communication session. For example, the system 100 may be configured to maintain and synchronize encryption keys and stream encrypted video data generated by the camera device 102 on a continuous basis for an extended period of time without interruption or initialization. Thus, the system 100 may enable constant surveillance for a group of devices that will consume the encrypted video data. As the camera device 102 may correspond to a security camera, in some examples the camera device 102 may include specialized components such as LED lights (e.g., a spotlight), a passive infrared sensor (PIR) detector, radar and/or distance sensors, an infrared cutoff filter, a motion sensor, and/or the like without departing from the disclosure.

The camera device 102 may be a constrained device, such as an embedded camera device, that has reduced processing resources relative to the group device 110. For example, the camera device 102 may be limited to certain resources that only allow it to perform limited functionality and/or processing. As will be described in greater detail below, the system 100 may reduce an amount of processing required by the camera device 102 by prioritizing the camera device 102 within a group of devices. For example, the system 100 may generate an unbalanced or asymmetrical binary tree with the camera device 102 closest to the root node in order to reduce an amount of processing required to be performed by the camera device 102.

By using an unbalanced tree architecture that prioritizes the camera device 102, the system 100 reduces an amount of processing required for the camera device 102 to encrypt video data. For example, placing the camera device 102 near the root of the unbalanced binary tree offloads processing from the camera device 102 to other group devices 110 and/or the system component(s) 120. At each device operating as a member of the group, a privacy enforcement policy operates to authorize/authenticate messages, using time-sensitive encryption keys that enable refined control over decrypted content. In some examples, the architecture can enable end-to-end encryption by removing any cloud services from the group. Alternatively, the architecture can include a cloud service with high or low privileges, enabling refined control over decrypted content while providing additional functionality.

As illustrated in FIG. 1A, the system component(s) 120 may determine (130) group membership associated with a camera device 102 and may generate (132) an asymmetric binary tree prioritizing the camera device 102. For example, the system component(s) 120 may determine a group of devices associated with an individual camera device 102 and may generate the asymmetric binary tree with the camera device 102 closest to a root node. Thus, the camera device 102 may be associated with a first node and the root node may be a parent node for the first node. In some examples, the system component(s) 120 may automatically assign the camera device 102 to the first node or second node that is a direct descendant of the root node. In other examples, however, the system component(s) 120 may determine which device in the group of devices has the least processing resources (e.g., most constrained device) and may assign that device to the first node or second node without departing from the disclosure.

After generating the asymmetric binary tree, the system component(s) 120 may initialize (134) Public/Private Key Pairs for each node in the binary tree, as described in greater detail below with regard to FIGS. 4A-4B. For example, the system component(s) 120 may cause each of the camera device and/or group device(s) 110 included in the binary tree to exchange messages as part of generating a ratchet tree, a public/private key tree, a secret tree, and/or the like.

To illustrate a simple example, the system component(s) 120 may initialize a group including just the system component(s) 120 and the camera device 102 by sending a first public key to the camera device 102. For example, the system component(s) 120 may select a first secret and use the first secret to generate the first public key. Upon receiving the first public key, the camera device 102 may select a second secret and use the second secret to generate a second public key, which the camera device 102 may send back to the system component(s) 120. Using the second public key and the first secret, the system component(s) 120 may determine a shared secret associated with both the system component(s) 120 and the camera device 102. Similarly, using the first public key and the second secret, the camera device 102 may determine the shared secret. Using this shared secret, both the system component(s) 120 and the camera device 102 may derive encryption keys (e.g., encryption key data) that may be used to encrypt/decrypt data sent between the camera device 102 and the system component(s) 120.

Referring to FIG. 1A, the camera device 102 may receive (140) a path secret associated with a root node and may determine (142) a symmetric key using the path secret. If step 140 is performed during an initialization step, such as in the previous example, the path secret may correspond to the shared secret described above. However, the disclosure is not limited thereto and the camera device 102 may receive the path secret any time that the system 100 updates the ratchet tree with fresh randomness. For example, if the group device 110 and/or the system component(s) 120 are part of the group of devices included in the binary tree, the camera device 102 may receive the path secret each time the group device 110 and/or the system component(s) 120 update their symmetric keys.

As illustrated in FIG. 1A, the camera device 102 may generate (144) video data, may generate (146) encrypted video data using the symmetric key, and may send (148) the encrypted video data to other devices/components within the system 100. For example, the camera device 102 may generate video data capturing one or more images, may generate the encrypted video data by encrypting the video data using the symmetric key, and may send the encrypted video data to the system component(s) 120, although the disclosure is not limited thereto.

In some examples, the system 100 can enable end-to-end encryption by removing any cloud services from the encryption group. For example, the system 100 may generate the binary tree using a group of devices that doesn't include the system component(s) 120 or other cloud services, which may limit functionality but enables better security and/or privacy protection. As a result, only the user devices are authorized and/or capable of determining encryption keys, requiring that any other devices obtain explicit authorization from one of the user devices in order to decrypt the encrypted video data. If the system component(s) 120 performed group initialization to enable group encryption, the system 100 may still enable end-to-end encryption by removing the system component(s) 120 once at least one group device 110 joins the encryption group.

Alternatively, the system 100 can include a cloud service with high privileges (e.g., historical access), low privileges (e.g., real-time access), or no privileges (e.g., access only when explicitly authorized), enabling refined control over decrypted content while providing additional functionality. In some examples, such as when cloud services are enabled with high privileges, the system component(s) 120 may be authorized and/or capable of determining the encryption keys and decrypting the encrypted video data. For example, the system component(s) 120 may provide additional functionality, such as providing playback to enable backwards compatibility with older devices, to display content on selected devices associated with a user profile (e.g., smart home devices), to provide decrypted video data for computer vision processing (e.g., object detection, facial recognition, etc.) in response to motion being detected, and/or the like. In a high-privilege mode, the system component(s) 120 may be a member of the group and may store past shared secrets, allowing the system component(s) 120 the ability to decrypt and provide to other cloud services decrypted video from the camera device 102. Alternatively, in a low-privilege mode, the system component(s) 120 may be a member of the group but may not store past shared secrets. For example, the system component(s) 120 may decrypt and provide to other cloud services real-time video from the camera device 102 (e.g., liveview), but may not decrypt stored video data because past shared secrets necessary for decryption would not be stored.

In other examples, however, the system component(s) 120 may be capable of decrypting the encrypted video data and/or providing the additional functionality described above only upon receiving encryption keys from the camera device 102 and/or the group device 110. For example, the camera device 102 may detect motion and send encryption key(s) to the system component(s) 120 to enable the system component(s) 120 to perform computer vision processing for a limited period of time. Additionally or alternatively, the group device 110 may request playback and send encryption key(s) to the system component(s) 120 to enable the system component(s) 120 to decrypt the encrypted video data and provide playback to the group device 110, which provides backwards compatibility with certain devices.

FIG. 1B illustrates a system having binary tree architecture and configured to perform decryption according to embodiments of the present disclosure. As illustrated in FIG. 1B, the system component(s) 120 may receive (160) a request to perform an action. In some examples, the system component(s) 120 may receive a request for video playback, which may correspond to stored video data that was previously generated or live video playback (e.g., "liveview"). In other examples, the system component(s) 120 may receive a request to perform processing to the video data, which again may correspond to processing stored video data (e.g., generating and/or editing a video clip, adding filters, etc.) or processing current video data, such as using the live video playback to perform computer vision processing (e.g., object detection, facial identification, etc.).

Depending on the action, the system component(s) 120 may retrieve (162) encrypted video data corresponding to the action, may determine (164) first encryption key(s) corresponding to the encrypted video data, and may generate (166) decrypted video data using the first encryption key(s). For example, the system component(s) 120 may determine the first encryption key(s) by receiving the first encryption keys from the camera device 102 and/or the group device 110 in step 164. Additionally or alternatively, the system component(s) 120 may be a member of the group of devices and may determine the first encryption key(s) based on one or more shared secrets received and/or stored.

After generating the decrypted video data, the system component(s) 120 may perform (168) an action using the decrypted video data. For example, the system component(s) 120 may send the decrypted video data to the group device 110 and/or another device associated with a user profile to provide playback to the user. Additionally or alternatively, the system component(s) 120 may edit the decrypted video data, apply filter(s) to the decrypted video data, perform computer vision processing to the decrypted video data, and/or the like without departing from the disclosure.

In some examples, the system component(s) 120 may optionally permanently delete (170) the first encryption keys. For example, if the system component(s) 120 is not a member of the group (e.g., not authorized to perform group encryption) and received the first encryption key(s) from the camera device 102 and/or the group device 110, the system component(s) 120 may delete the first encryption key(s) upon performing the action. Additionally or alternatively, even if the system component(s) 120 is a member of the group, the system component(s) 120 may delete the first encryption key(s) and/or any shared secrets upon being removed from the group. For example, if the system 100 receives user input indicating that end-to-end encryption is desired, the system 100 may modify the binary tree to remove the system component(s) 120 from the group and the system component(s) 120 may delete any stored encryption keys and/or shared secrets.

In some examples, the group device 110 may be an electronic device configured to capture and/or receive audio data. For example, the device 110 may include a microphone array configured to generate microphone audio data that captures input audio, although the disclosure is not limited thereto and the device 110 may include multiple microphones without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data. Whether the microphones are included as part of a microphone array, as discrete microphones, and/or a combination thereof, the device 110 may generate the microphone audio data using multiple microphones. For example, a first channel of the microphone audio data may correspond to a first microphone (e.g., k=1), a second channel may correspond to a second microphone (e.g., k=2), and so on until a final channel (K) corresponds to final microphone (e.g., k=K).

The audio data may be generated by a microphone array of the device 110 and therefore may correspond to multiple channels. For example, if the microphone array includes eight individual microphones, the audio data may include eight individual channels. In some examples, the device 110 may perform sound source localization processing to separate the audio data based on sound source(s) and indicate when an individual sound source is represented in the audio data and/or a direction/location associated with the sound source.

An audio signal is a representation of sound and an electronic representation of an audio signal may be referred to as audio data, which may be analog and/or digital without departing from the disclosure. For ease of illustration, the disclosure may refer to either audio data (e.g., microphone audio data, input audio data, etc.) or audio signals (e.g., microphone audio signal, input audio signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing without departing from the disclosure. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

A video signal is a representation of an image and/or series of images and an electronic representation of a video signal may be referred to as image data, video data, and/or the like, which may be analog and/or digital without departing from the disclosure. For ease of illustration, the disclosure may refer to either data (e.g., video data, image data, etc.) or signals (e.g., video signal, image signal, etc.) interchangeably without departing from the disclosure. Similarly, the disclosure may refer to capturing video as image data without departing from the disclosure.

FIG. 2 illustrates an example of encryption architecture according to embodiments of the present disclosure. As illustrated in FIG. 2, encryption architecture 200 may include a camera device 102, one or more group devices 110, and the system component(s) 120. In some examples, the system component(s) 120 may include a message delivery system 210, a database 215, a cloud encryption proxy 220, shared resources 230, and/or a media transport system 240, although the disclosure is not limited thereto.

For ease of illustration, due to the number of different implementations and functionality that is enabled, the cloud encryption proxy 220 and the shared resources 230 are illustrated separately from the message delivery system 210, the media transport system 240, the camera device 102, and/or the group devices 110. For example, FIG. 2 does not illustrate communication arrows between (i) the message delivery system 210, the media transport system 240, the camera device 102, and/or the group devices 110 and (ii) the cloud encryption proxy 220 and the shared resources 230. However, the disclosure is not limited thereto, and the cloud encryption proxy 220 and/or the shared resources 230 may communicate with the camera device 102, the group devices 110, the message delivery system 210, the media transport system 240, and/or other devices/components within the system 100 without departing from the disclosure. Example communication diagrams are described below with regard to FIGS. 7-8C.

As illustrated in FIG. 2, the encryption architecture 200 may transmit messages and/or data between the camera device 102, the group device(s) 110, the cloud encryption proxy 220, the shared resources 230, and/or other components of the system 100 using two different system components 120. For example, the system 100 may include the message delivery system 210 to distribute first data and the media transport system 240 to distribute second data, although the disclosure is not limited thereto. In some examples, the message delivery system 210 may be configured to distribute first messages, information, and/or data amongst the system 100 as part of enabling group encryption, while the media transport system 240 may be configured to distribute second messages, information, and/or data amongst the system 100 as part of video distribution.

As described in greater detail below, the system 100 may determine a group of devices associated with an individual camera device 102 and may generate a binary tree representing the group of devices. For example, in order to enable enhanced encryption, the system 100 may generate a binary ratchet tree group containing at least the camera device 102 and an additional device as members, although the number of devices included in the binary ratchet tree group may vary without departing from the disclosure. In this example, the message delivery system 210 is involved in the encryption key derivation process and is configured to enable security and privacy associated with exchanging and synchronizing the encryption keys. For example, the message delivery system 210 may be a rule-based access control system configured to control access by authenticating and validating messages and/or devices associated with the binary ratchet tree group.

In some examples, the system 100 may use the message delivery system 210 to distribute and/or store information about the binary ratchet tree group. For example, the message delivery system 210 and/or the database 215 may store information about a public state associated with the binary ratchet tree group, individual group members (e.g., devices included in the binary ratchet tree group), a group history associated with the binary ratchet tree group, key packages, information about the binary tree, and/or the like, although the disclosure is not limited thereto. In this example, changes such as an addition or removal of group members, key rotation, modification of group policies, and/or the like alter the state of the group, and these updates need to be accessible to all members of the group to ensure that they have the latest encryption keys. Thus, the message delivery system 210 may facilitate the distribution of these updates and may perform the following functions:

- Early validation of group messages using a Privacy Enforcement Policy (PEP), which may include rejecting unauthorized messages before distribution;
- Pushing messages to group members, which may be done via other services and/or system components 120 without departing from the disclosure;
- Storing messages to respond to future requests; and
- Responding to requests from devices (e.g., clients) seeking updates they may have missed while offline.

In the example illustrated in FIG. 2, the message delivery system 210 is illustrated as receiving first data from, and/or sending first data to, the camera device 102, the group devices 110, and/or additional devices or components. For example, the first data may correspond to information, messages, and/or the like associated with the group encryption and/or the binary ratchet tree group, although the disclosure is not limited thereto. The message delivery system 210 may include a database 215 and may be configured to store the first data and/or distribute the first data throughout the system 100 as needed. While not illustrated in FIG. 2, the message delivery system 210 may send/receive the first data from the cloud encryption proxy 220, the shared resources 230, and/or the like without departing from the disclosure.

Although the message delivery system 210 is responsible for handling group messages, the message delivery system 210 itself is not a member of the binary ratchet tree group. Therefore, while the message delivery system 210 is used to distribute encrypted messages to the binary ratchet tree group, the message delivery system 210 is unable to decrypt message contents of these encrypted messages. However, the message delivery system 210 may utilize the Privacy Enforcement Policy (PEP) to authenticate whether the message is authorized and originating from a group member associated with the binary ratchet tree group. Thus, the message delivery system 210 may use the PEP to validate messages and/or devices.

As used herein, the PEP is a security mechanism that implements all of the privacy rules for the binary ratchet tree group. For example, the PEP dictates and enforces what each member of the group is allowed or not allowed to do. The PEP may be implemented using a role-based model where each member of the binary ratchet tree group is assigned a role defining its privileges. Thus, the PEP runs on every member of the binary ratchet tree group, as well as some system component(s) 120 (e.g., cloud services) that handle the messages.

In some examples, the primary role of the PEP is to check the authorization of group messages. For example, the PEP may be configured to reject attempts by certain members of the binary ratchet tree group to add or remove other members, ensuring that only an administrator (e.g., specific group device 110 associated with a primary user for an individual user profile) maintains control of the binary ratchet tree group. This is the mechanism that will enforce that a shared user can only add/remove group members associated with a second user profile corresponding to the shared user (e.g., the shared user's user profile), but that the owner (e.g., primary user) of the camera device 102 can add/remove any group member from the binary ratchet tree group. Another example would be that only the owner (e.g., primary user) can enable/disable end-to-end encryption, as described in greater detail below.

The PEP may run as part of a binary ratchet tree stack on each member of the binary ratchet tree group and may validate that group messages triggering group state changes are within policy, rejecting those that are not. The PEP may also run within the message delivery system 210 to provide early validation of group commit messages to members issuing them. This avoids a situation where a group member issues group commit messages that are not within policy and being removed from the binary ratchet tree group as a result. As described in greater detail below, the PEP only relies on the public portion of the binary tree/group state. In some examples, the PEP may be implemented as a collection of values/settings that are stored within the binary ratchet tree group state, and an engine that can use those values to decide whether a group state change or an action is allowed for a specific member. To illustrate an example, if the PEP enforces that a shared user can only add group members from the second user profile (e.g., shared user's own account), the binary ratchet tree group state may store values corresponding to the role of the shared user and a public portion of their account signing key. For example, a shared user may only be allowed to add another group member (e.g., add a group device 110 to the binary ratchet tree group) if the credentials in the group key package for the new group member are signed with the correct account signing key.

In some examples, rotation of signing keys is another important aspect that the message delivery system 210 and/or the PEP facilitate. Due to the asynchronous nature of the scheme, it is important for a group member to be able to process those messages whenever it comes back online, which can potentially be days or weeks later. If the group add commit is dependent on a signature check, that signing key needs to be tied to the binary ratchet tree group state and its evolution. Thus, the system 100 may prevent a situation where rotating a signing key prevents group member(s) from being able to process old add commits that depend on a previous key.

As illustrated in FIG. 2, the camera device 102 may generate image data (e.g., capture video), encrypt the image data to generate encrypted data, and send the encrypted data to the media transport system 240 for distribution to other devices/components included in the system 100. Thus, the media transport system 240 is configured to perform video distribution.

In the example illustrated in FIG. 2, the media transport system 240 is illustrated as receiving second data from the camera device 102, as well as sending the second data to the group devices 110 and/or additional devices or components. In some examples, the second data may correspond to encrypted media content generated by the camera device 102. For example, FIG. 2 illustrates an example in which the second data is encrypted data 245, which may correspond to image data representing image(s) captured by the camera device 102. However, the disclosure is not limited thereto, and the encrypted data 245 may correspond to video data, image data, audio data, and/or a combination thereof without departing from the disclosure.

As illustrated in FIG. 2, the media transport system 240 may be configured to store the second data and/or distribute the second data throughout the system 100 as needed. For example, the media transport system 240 may send the encrypted data 245 to one or more of the group devices 110, although the disclosure is not limited thereto. While not illustrated in FIG. 2, the media transport system 240 may send the second data to the cloud encryption proxy 220, the shared resources 230, and/or the like without departing from the disclosure. In some examples, the media transport system 240 may be configured to store the encrypted data 245 until receiving a request from a group device 110 and/or other system component(s) 120 (e.g., shared resources 230). In response to the request, the media transport system 240 may transmit the encrypted data 245 to the requesting device. Additionally or alternatively, the media transport system 240 may stream the encrypted data 245 on a continuous basis and the group device(s) 110 and/or the other system component(s) 120 may access the stream as desired without departing from the disclosure.

For ease of illustration, the following disclosure may refer to the media transport system 240 storing the encrypted data and providing the encrypted data on demand. For example, the media transport system 240 may continuously store the encrypted data for a desired time period (e.g., fixed window of time), such that the group devices 110 and/or the shared resources 230 may retrieve the encrypted data from the media transport system 240. Thus, if the group devices 110 and/or the shared resources 230 need to access a portion of the encrypted data, they can send a request to the media transport system 240 indicating a selected time window and the media transport system 240 may send a portion of the encrypted data corresponding to the selected time window. Additionally or alternatively, the group devices 110 and/or the shared resources 230 may send a request to the media transport system 240 to stream the encrypted data and the media transport system 240 may send the encrypted data until the encrypted data is no longer requested. However, the disclosure is not limited thereto, and in some examples another component within the system component(s) 120 may be configured to store and/or distribute the encrypted data without departing from the disclosure.

As illustrated in FIG. 2, the encryption architecture 200 may optionally include the cloud encryption proxy 220 and/or the shared resources 230. For example, the cloud encryption proxy 220 may correspond to a cloud service that provides compatibility for endpoints that do not support enhanced encryption. In some examples, the cloud encryption proxy 220 may be a member of the binary ratchet tree group and can encrypt/decrypt enhanced encryption content. The cloud encryption proxy 220 may or may not store past shared secrets of the group, depending on user settings. When access to past content is not necessary, only current video content (e.g., liveview), the cloud encryption proxy 220 can operate in a relatively low privilege mode with tightly-scoped access. In contrast, when access to past content is required and a group device 110 and/or the camera device 102 is not available to provide authorization, the cloud encryption proxy 220 may operate in a high privilege mode with broad access.

In some examples, the system 100 may enable the cloud encryption proxy 220 and/or the shared resources 230 with high or low privileges, enabling refined control over decrypted content while providing additional functionality. If the cloud encryption proxy 220 and/or the shared resources 230 is operating in a low privilege mode, the cloud encryption proxy 220 and/or the shared resources 230 may decrypt the encrypted data 245 when explicitly authorized by one of the group devices 110 and/or the camera device 102. Examples of additional functionality provided in low privilege mode include performing computer vision processing using encryption keys received from the camera device 102, providing playback services to a group device 110 using encryption keys received from the group device 110, and/or the like.

Additionally or alternatively, the cloud encryption proxy 220 may operate in a high privilege mode without departing from the disclosure. In some examples, the cloud encryption proxy 220 may operate in high privilege mode and may store past shared secrets. For example, the cloud encryption proxy 220 may be a member of the binary ratchet tree group and may store past shared secrets, enabling the cloud encryption proxy 220 to determine encryption keys and decrypt the encrypted data 245 independently. The disclosure is not limited thereto, however, and in other examples the cloud encryption proxy 220 may operate in high privilege mode but may not store past shared secrets. For example, the cloud encryption proxy 220 may be a member of the binary ratchet tree group with access to a current shared secret, enabling the cloud encryption proxy 220 to decrypt the encrypted data 245 and provide real-time video to other devices/components of the system 100. However, the cloud encryption proxy 220 is unable to decrypt stored encrypted data 245 (e.g., previously generated video data) because past shared secrets necessary for decryption would not be stored.

Referring to the low privilege mode, cloud services that do not require access to all content encryption keys will not be a part of the binary ratchet tree group and may be implemented as dependent services, meaning that they must obtain the decryption keys from an existing member of the binary ratchet tree group (e.g., group device 110 and/or camera device 102). For example, the shared resources 230 may be configured to perform computer vision processing and only needs access to motion triggered streams. Thus, when the camera device 102 detects motion, the camera device 102 may share the decryption key with a particular instance of the shared resources 230 that process the stream. The security of that key sharing mechanism may be enforced by the Privacy Enforcement Policy engine, which may be provisioned with a specific signing key to ensure that (i) the sharing request has been issued by the particular instance (e.g., computer vision processing) and (ii) keys are only shared for motion triggered streams. By encrypting the shared key to an instance-specific encryption key, the system 100 may restrict access to only the specific instance selected to process the stream. Further, the shared key is never persisted and is deleted after the computer vision processing is performed, limiting the length of time that the shared resources 230 has access to the encrypted content.

The system 100 may additionally ensure the revocation of decryption keys for both group members and dependent services. For example, group members may experience revocation through their removal from the binary ratchet tree group, which not only prevents any future access to decryption keys but also deletes their existing store of past content decryption keys. In contrast, the system 100 enforces revocation for dependent services by eliminating the unique service signing key from its Privacy Enforcement Policy, effectively blocking any group member from subsequently sharing decryption keys with a revoked cloud service.

When the cloud encryption proxy 220 is operating in the high privilege mode and a member of the binary ratchet tree group, the system component(s) 120 have some level of access to the encrypted data. Thus, operating the cloud encryption proxy 220 in high privilege mode and end-to-end encryption are mutually exclusive. As a result, enabling end-to-end encryption (e.g., operating in an end-to-end encryption mode) will automatically remove the cloud encryption proxy 220 from the binary ratchet tree group and/or revoke any privileges associated with the cloud encryption proxy 220.

Figure 3A:
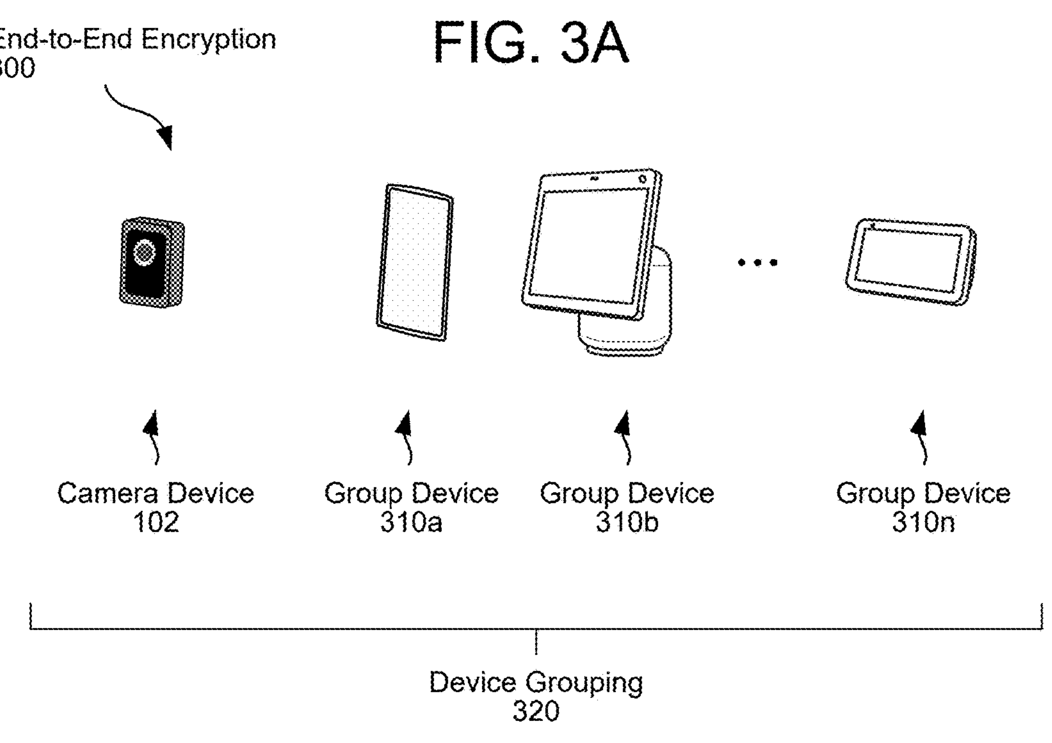
FIGS. 3A-3B illustrate examples of end-to-end encryption and proxy encryption according to embodiments of the present disclosure.
Figure 3B:
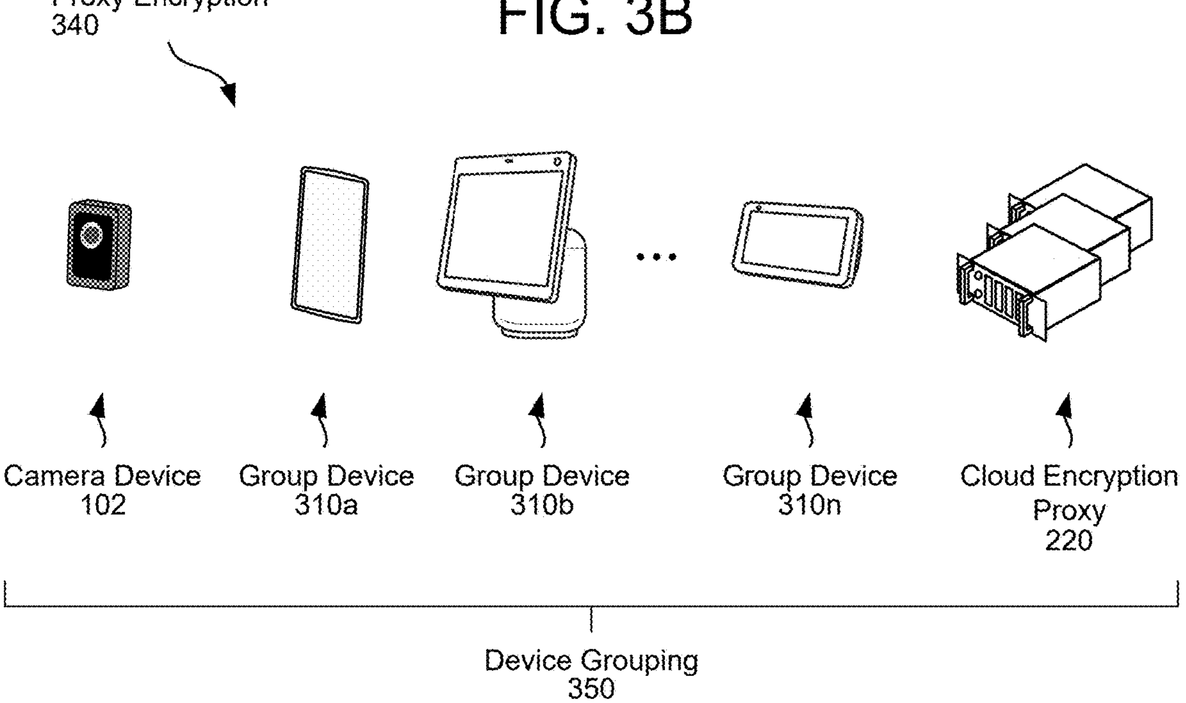

FIGS. 3A-3B illustrate examples of end-to-end encryption and proxy encryption according to embodiments of the present disclosure. As illustrated in FIG. 3A, end-to-end encryption 300 may correspond to a first device grouping 320 that includes the camera device 102 and one or more group devices 110. For example, the first device grouping 320 is represented as including group device **310*a*, group device 310*b*, and group device 310*n*. However, while FIG. 3A illustrates multiple group devices 110*a*-110*n*, the disclosure is not limited thereto and the end-to-end encryption 300 may only include the camera device 102 and a single group device 110** without departing from the disclosure.

As illustrated in FIG. 3A, the example of end-to-end encryption 300 enhances privacy by only including user devices in the first device grouping 320. As a result, only the user devices are authorized and/or capable of determining the encryption keys, requiring that any other devices obtain explicit authorization from one of the user devices in order to decrypt the encrypted video data. In some examples, however, the system 100 may include additional system components to enable additional functionality.

As illustrated in FIG. 3B, proxy encryption 340 may correspond to a second device grouping 350 that includes the camera device 102, one or more group devices **110*a*-110*n*, and the cloud encryption proxy 220. In this implementation, the cloud encryption proxy 220 is also authorized and/or capable of determining the encryption keys and decrypting the encrypted video data. For example, the cloud encryption proxy 220** may provide additional functionality, such as providing playback to enable backwards compatibility with older devices, to display content on selected devices associated with a user profile (e.g., smart home devices), to provide decrypted video data for computer vision processing (e.g., object detection, facial recognition, etc.) in response to motion being detected, and/or the like.

Additionally or alternatively, the cloud encryption proxy 220 may be used to perform group initialization with the camera device 102. For example, the cloud encryption proxy 220 may enable enhanced encryption by initializing a group that only includes the camera device 102 and the cloud encryption proxy 220. By virtue of the group being initialized, the camera device 102 may encrypt the video data for enhanced privacy, while the cloud encryption proxy 220 provides video playback to the user upon request. This arrangement may continue until the user adds additional group devices 110 to the group. Upon adding one or more group devices 110, the user may choose to continue with the second device grouping 350 (e.g., with the cloud encryption proxy 220 providing additional functionality) or switch to the first device grouping 320 for end-to-end encryption 300.

Figure 4A:
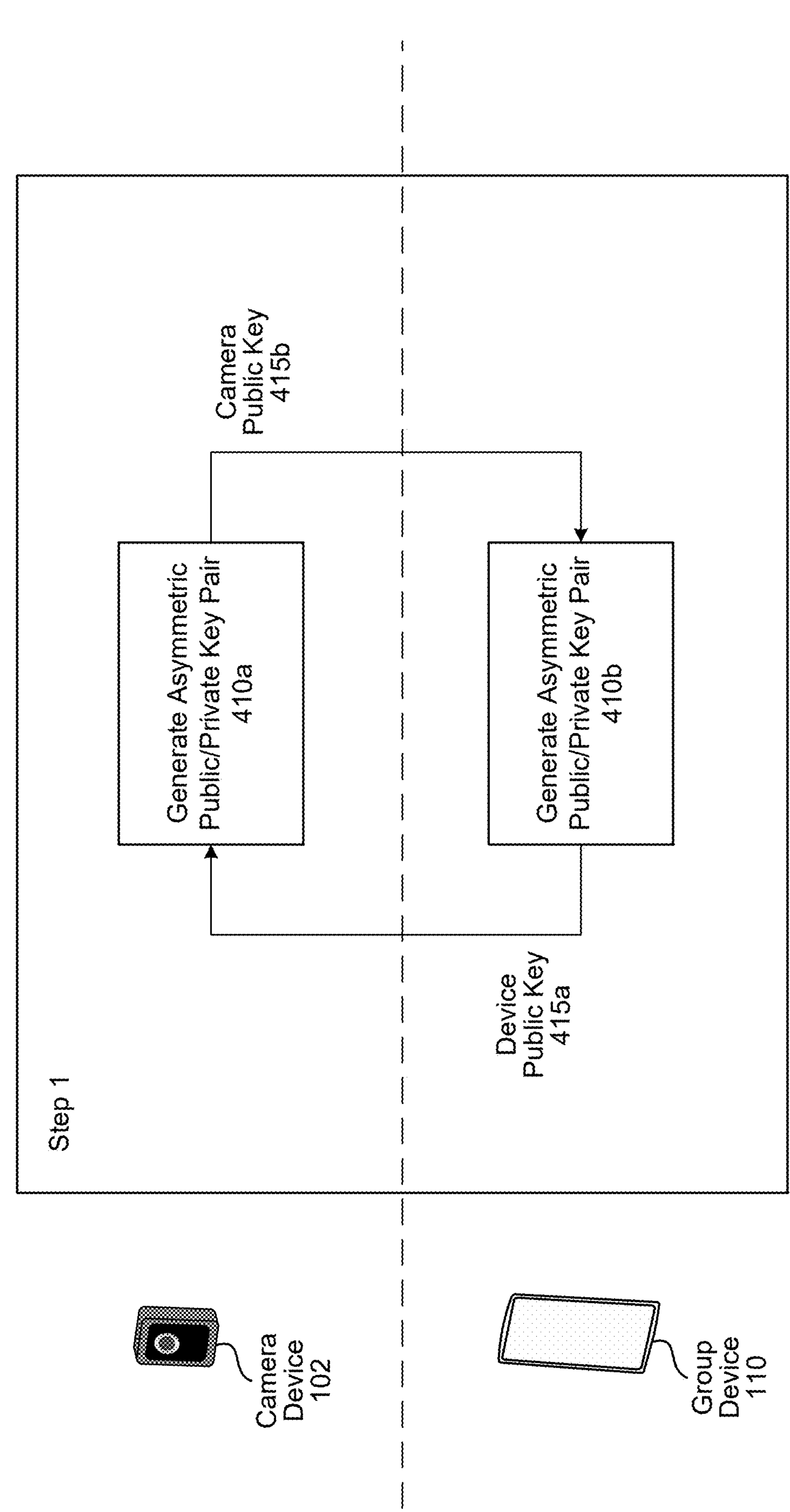

FIGS. 4A-4B illustrate examples of initialization and synchronization of encryption keys according to embodiments of the present disclosure. In order to enable enhanced encryption, the system 100 must perform group initialization to generate a binary ratchet tree group containing at least the camera device 102 and an additional device as members. As described above, in some examples the cloud encryption proxy 220 may initialize the binary ratchet tree group with itself as the additional device, enabling the cloud encryption proxy 220 to provide playback for the user upon request. The disclosure is not limited thereto, however, and FIG. 4A illustrates an example in which the user performs group initialization using a group device 110. When performing group initialization, the camera device 102 and the additional device exchange public keys and the group is initialized with the message delivery system 210.

An example of performing initialization 400 is illustrated in FIG. 4A. As illustrated in FIG. 4A, the camera device 102 and the group device 110 may exchange public keys as part of generating an asymmetric public/private key pair. For example, the group device 110 may generate (410*b*) an asymmetric Public/Private Key Pair and send a Device Public Key 415*a* to the camera device 102. Using the device public key 415*a*, the camera device 102 may generate (410*a*) an asymmetric Public/Private key pair and send a camera public key 415*b* back to the group device 110 to complete the initialization 400.

As illustrated in FIG. 4B, after performing the initialization 400, the system 100 may perform synchronization 420 to generate encryption keys on both the camera device 102 and the group device 110. For example, the camera device 102 may perform shared secret exchange using Public Key Encryption (430) and may determine a shared secret (432). Using the shared secret, the camera device 102 may perform a Key Derivation Function operation (434), determine a symmetric key (436), and use the symmetric key to encrypt video data (438).

When a new key is required, the camera device 102 may use the previous symmetric key to derive a new symmetric key 440, looping back to step 434 and repeating steps 434-438 with the new symmetric key. As described in greater detail below, encryption keys are derived via a key schedule using the Key Derivation Function operation. A period of time between two tree updates is called an epoch, and this encryption protocol provides forward secrecy between two epochs, as secret/private values are deleted once they are no longer needed, and secrets from two epochs are not linked. Within an epoch, the forward secrecy is protected due to the inner ratcheting of the encryption keys.

As illustrated in FIG. 4B, during synchronization 420 the group device 110 may perform shared secret exchange using Public Key Encryption (450) and determine the shared secret (452). Using the shared secret, the group device 110 may perform a Key Derivation Function operation (454), determine a symmetric key (456), and use the symmetric key to decrypt video data (458). When a new key is required, the group device 110 may use the previous symmetric key to derive a new symmetric key 460, looping back to step 454 and repeating steps 454-458 with the new symmetric key.

For ease of illustration, FIGS. 4A-4B conceptually illustrate a simple example of performing initialization 400 and/or synchronization 420. For example, FIG. 4B illustrates that the system 100 may perform synchronization 420 using a key derivation function operation. However, the disclosure is not limited thereto, and the system 100 may perform additional steps as part of initialization 400 and/or synchronization 420 without departing from the disclosure. For example, while not illustrated in FIGS. 4A-4B, the system 100 may implement public encryption, digital signatures, a MAC algorithm, and/or other techniques known to one of skill in the art without departing from the disclosure. Thus, in some examples the system 100 may implement any technique associated with enabling a Continuous Group Key Agreement (CGKA) without departing from the disclosure. For example, while not illustrated in FIG. 4B, performing the shared secret exchange in steps 430/450 and/or deriving a new symmetric key in steps 440/460 may include additional steps not explicitly described above without departing from the disclosure.

While not illustrated in FIGS. 4A-4B, the system 100 may add a new member to the binary ratchet tree group using similar steps. For example, a user device and/or the cloud encryption proxy 220 may send a public key to the group device 110 and the group device 110 may send a message to the message delivery system 210 registering the user device and/or the cloud encryption proxy 220 into the group and updating the state of the group. In some examples, the message delivery system 210 may validate the message first, as only the user (e.g., administrator, owner account, etc.) can add an additional device to the binary ratchet tree group. After validation, the message delivery system 210 may store the message for future distribution, while pushing the message to the other group members (e.g., camera device 102). When other group members receive the message, they also validate the message, update their knowledge of the group, and the shared secret changes as a result.

In some examples, new members do not gain access to past data, because they only receive the group's shared secret moving forwards. If authorized by the user, however, the system 100 may share a list of past shared secrets with the new member device. The range of shared secrets to transmit can be limited or complete, as desired by the user.

Similar to how the system 100 adds the new member to the binary ratchet tree group, the system 100 may also remove a member from the binary ratchet tree group. For example, the user may generate user input directing the system 100 to remove the member device and the system 100 may send a message to the message delivery system 210 updating the binary ratchet tree group. After validating that the message was authorized by the user and/or the member device, the message delivery system 210 may store the message for future distribution while also pushing it to the remaining members of the group. The act of removing a member device updates the groups shared secret, so the removed member device can no longer access future content.

Figure 5B:
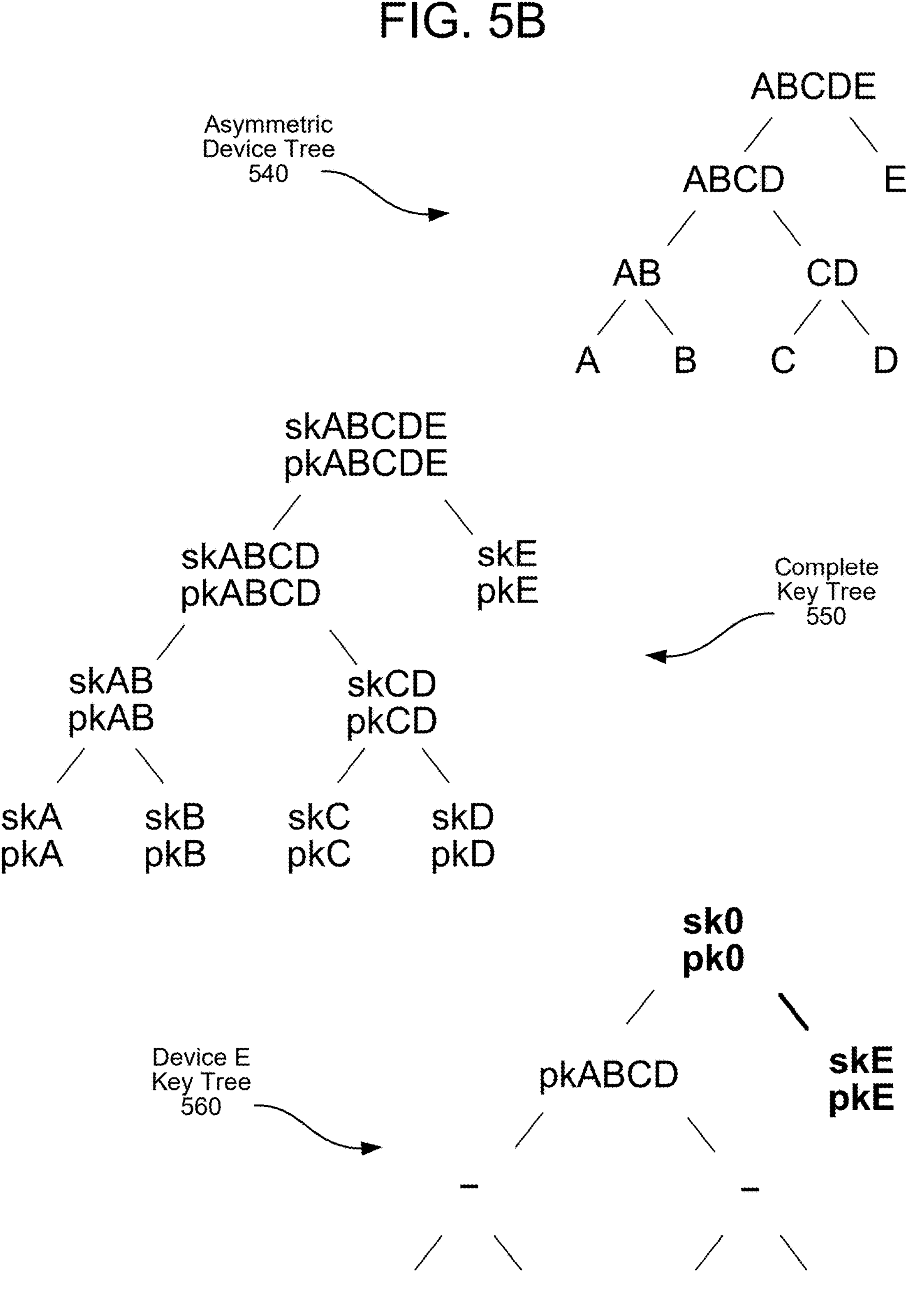

FIGS. 5A-5B illustrate examples of symmetric and asymmetric binary trees according to embodiments of the present disclosure. FIG. 5A illustrates an example of a symmetric device tree 510, which is a binary tree comprising four devices (e.g., Device A, Device B, Device C, and Device D). Each of the devices corresponds to a leaf node, represented in the symmetric device tree 510 as a first row (e.g., bottom row). As the symmetric device tree 510 is a balanced binary tree, the four leaf nodes branch from two non-leaf nodes, represented as a second row in the symmetric device tree 510. For example, Device A and Device B are associated with a first non-leaf node (e.g., AB), while Device C and D are associated with a second non-leaf node (e.g., CD). Finally, these two nodes branch from a root node, represented in the symmetric device tree 510 as a third row (e.g., top row) labeled "ABCD."

To enable encryption/decryption for the group members, the symmetric device tree 510 is associated with a ratchet tree of public and private keys, as well as a secret tree. For example, FIG. 5A illustrates an example of a complete key tree 520 that corresponds to the symmetric device tree 510 described above. As illustrated in FIG. 5A, each node in the symmetric device tree 510 corresponds to a secret key and a public key. For example, the first leaf node associated with Device A corresponds to a first secret key (e.g., skA) and a first public key (e.g., pkA), the second leaf node associated with Device B corresponds to a second secret key (e.g., skB) and a second public key (e.g., pkB), and so on for each of the leaf nodes. Using this labeling convention, the first non-leaf node (e.g., AB) is associated with a fifth secret key (e.g., skAB) and a fifth public key (e.g., pkAB) and the second non-leaf node (e.g., CD) is associated with a sixth secret key (e.g., skCD) and a sixth public key (e.g., pkCD). Finally, the root node (e.g., ABCD) is associated with a seventh secret key (e.g., skABCD) and a seventh public key (e.g., pkABCD).

While FIG. 5A illustrates an example of the complete key tree 520, each individual device included in the symmetric device tree 510 only needs to know a portion of the public keys in order to generate the encryption keys needed to encrypt and/or decrypt content. For example, an individual device needs to know the secret/public keys for each node between itself and the root node (e.g., direct path from the leaf node to the root node), which may be referred to as path nodes, along with the public key associated with any nodes descending from one of the path nodes.

FIG. 5A illustrates an example of a Device A key tree 530, which illustrates all of the secret keys and public keys that are required to perform encryption/decryption. As illustrated in FIG. 5A, the direct path from the first leaf node to the root node is indicated in bold, with the first non-leaf node (e.g., AB) represented as a first path node (e.g., path 0) and the root node (e.g., ABCD) represented as a second path node (e.g., path 1). For example, the Device A key tree 530 relabels the first non-leaf node (e.g., AB) as being associated with the fifth secret key (e.g., sk0) and the fifth public key (e.g., pk0), while the root node (e.g., ABCD) is associated with a seventh secret key (e.g., sk1) and a seventh public key (e.g., pk1).

As illustrated in FIG. 5A, Device A needs to know both the secret key and the public key for each of the path nodes. Thus, Device A needs to know the first pair (e.g., sk0, pk0) associated with the first path node (e.g., path 0, or AB) and the second pair (e.g., sk1, pk1) associated with the second path node (e.g., path 1, or ABCD). However, Device A only needs to know the public key for the first node descending from each of the path nodes. For example, Device A needs to know the second public key (e.g., pkB) associated with the second leaf node (e.g., B), as it descends from the first path node (e.g., path 0), as well as the sixth public key (e.g., pkCD) associated with the second non-leaf node (e.g., CD), as it descends from the second path node (e.g., path 1).

While not illustrated in the Device A key tree 530 shown in FIG. 5A, there is a chain of derivation for elements referred to as path secrets (e.g., PS[n]). For example, for each node on the path from the leaf node (e.g., A) to the root node (e.g., ABCD), the node's secret (e.g., sec_i, where i represents the position of the node with regard to the leaf) is calculated using the key derivation function described in greater detail above. For example, the first path node (e.g., path 0, or AB) is associated with a first path secret (e.g., PS[0]) and the second path node (e.g., path 1, or ABCD) is associated with a second path secret (e.g., PS[1]).

To illustrate an example, the system 100 may utilize a key encapsulation function and a key derivation function, where each node can include a private key, a public key, and a hash with information about the node's parent. For example, the key derivation function may take as input a key or secret and a label or keyword value. The key derivation function may be utilized to determine, based on an initial secret (which may be a newly generated random value, point, etc.), a sequence of path secrets for each path step from a leaf node to the root.

The path secret for a node along the path is used to generate a node secret for that node using the same key derivation function. For example, the first path node (e.g., path 0, or AB) is a parent node of the first leaf node (e.g., A), the second path node (e.g., path 1, or ABCD) is a parent node of the first path node (e.g., path 0, or AB), and so on. A node secret for the leaf node itself can also be generated.

A key encapsulation mechanism is used to generate, for each respective node along the path based on the respective generated node secret for that respective node, a new public-private key pair (e.g., sk0 and pk0 for the first path node). A new public-private key pair can similarly be determined for the leaf node itself, with the leaf secret equal to the initial secret for the leaf node and returning a secret key (e.g., skA) and a public key (e.g., pkA) for the first leaf node (e.g., A). The device corresponding to the leaf node will then cause sending of update messages to other devices corresponding to other leaf nodes. Specifically, for each respective node, a leaf node will need to know the new path secret for that respective node if that respective node is in its path to the root, and will otherwise at most need to know the public key. For example, an update by Device A would involve generating a new initial secret and then determining first path secret (e.g., sk0) for the parent node of Device A and Device B (e.g., first path node (e.g., path 0, or AB)). It would further involve determining a second path secret (e.g., sk1) for the parent node of the first path node (e.g., second path node, indicated as path 1, or ABCD). Generally, the depth of the tree is log (n), where n is the number of devices. For example, when a device updates their private key, only log N nodes must be modified/updated (e.g., nodes along the path from the device's leaf node to the root node).

If Device A updates the tree with fresh randomness, it effectively creates a new updated ratchet tree and must broadcast information relevant to each leaf node in the symmetric device tree 510. In order to update the other leaf nodes, some leaf nodes will need to know the corresponding new path secret if that node is directly above their leaf, whereas other uses will only need to know the public key. For example, for Device A and Device B's parent node, Device B needs to know the first path secret (e.g., PS[0]) to compute all other keys, but Device C and Device D only need to know the fifth public key (e.g., pk0). Thus, Device A may send the newly generated first path secret (e.g., PS[0]) corresponding to the first path node (e.g., path 0, or AB) to Device B in order to enable Device B to generate the necessary keys (e.g., sk0/pk0 and sk1/pk1), while also sending the fifth public key (e.g., pk0) to Device C and Device D in order to enable them to generate the necessary keys (e.g., sk1/pk1).

Using this, encryption keys are then derived via a key schedule with the value referred to as a commit secret, equal to what can be written as P[n+1] (e.g., KDFp(PS[n]), where KDF denotes a Key Derivation Function operation), the derivation of the path secret at the root (e.g., node secret for the root node). This commit secret is used to generate a tree of secrets with the same structure as the binary tree corresponding to the devices (e.g., symmetric device tree 510), which can be characterized as a ratchet tree. Each leaf of the secret tree is associated with the same device as a corresponding leaf of the ratchet tree. Thus, the secret tree can be derived top-down based on the node secret corresponding to the root node, with a secret tree node secret for child nodes being determined based on the secret tree node secret for each parent node. For example, the node secret for the root node (e.g., ABCD) would be used to derive node secrets for its two child nodes (e.g., AB and CD). Thus, a secret tree node secret is generated for each leaf node corresponding to a device in the group of devices.

The respective secret tree node secret for each leaf node of the secret tree is used as the first element to derive a sequence or chain of secret tree node secrets for that node. Each element in the chain or sequence can be characterized as corresponding to a ratchet position or ratchet generation without departing from the disclosure.

As used herein, the term authenticated encryption may refer to an encryption scheme which ensures that an encrypted message is impossible to understand without a key, and also includes authentication data (e.g., an authentication tag or value) that the sender of the encrypted message can calculate only with the key. Such an encryption scheme may allow a message to contain associated data that may not be encrypted, but where tampering or editing of the associated data will be detected. Such an encryption scheme is often characterized as an authenticated encryption with associated data (AEAD) scheme. For each ratchet position for each node, an AEAD encryption key and nonce can be generated. For example, each key and nonce may be used only once and deleted thereafter once no longer needed.

A period of time between two tree updates is called an epoch, and this encryption protocol provides forward secrecy between two epochs, as secret/private values are deleted once they are no longer needed, and secrets from two epochs are not linked. Within an epoch, the forward secrecy is protected due to the inner ratcheting of the encryption keys.

As used herein, each instance of a ratchet tree is defined in the same way as an instance of a Hybrid Public Key Encryption (e.g., HPKE) containing a Key Encapsulation Mechanism, a Key Derivation Function, and an Authenticated Encryption with Additional Data (AEAD) scheme. Thus, each node in the ratchet tree may contain the following values:

- a private key, if it is on the direct path from the leaf node to the root node,
- a public key,
- a list of unmerged leaves, which represents the leaf nodes for devices that just joined and are not current with the private keys of nodes above them,
- a hash with information about the node's parent (e.g., changes when the node changes),
- a credential issued by an authentication system, if the node is a leaf node, that authenticates the leaf node's owner.

The list of unmerged leaves is required so that devices with unmerged leaves can still receive messages. For example, if Device D does not yet know the shared private key skCD, then Device B cannot use the shared private key pkCD to send a message to both Device C and Device D, and will instead need to use the fourth public key (e.g., pkD) until Device D has a merged leaf.

In some examples, the unmerged leaves may be associated with the root node while in the unmerged state (e.g., not current with the private keys of nodes above them). For example, the system 100 may temporarily reconfigure the binary tree to accommodate any unmerged leaves (e.g., unmerged leaves may be a direct child of the root node) until they are made current and the binary tree is updated with a permanent configuration. Regardless of how long the unmerged leaves are in this state, however, the state is considered temporary or transient, as the binary tree will be updated following the unmerged leaves becoming current. For example, once the unmerged leaf performs an update or commit, then it becomes merged and takes its place within the binary tree. This is distinguishable from how the camera device 102 may be prioritized as part of an unbalanced binary tree that optimizes encryption processing for the camera device 102 by affirmatively placing the camera device 102 as a direct child of the root node (e.g., root node is a parent node to a first node associated with the camera device 102).

Using the concepts illustrated in FIG. 5A, the system 100 may further improve a performance of the group encryption by implementing an unbalanced binary tree to prioritize the camera device 102 and reduce an amount of processing required to encrypt the video data. For example, as the camera device 102 may have limited processing relative to the group devices 110, placing the camera device 102 closer to the root node reduces an amount of steps required to encrypt the video data.

An example of this is illustrated in FIG. 5B as an asymmetric device tree 540. As illustrated in FIG. 5B, the asymmetric device tree 540 includes the same four devices described previously, while adding a fifth device (e.g., Device E) descending directly from a new root node (e.g., ABCDE). In this implementation, Device E is closer to the root node than any of the other leaf nodes and thereby benefits from a reduced amount of processing required to perform encryption.

As illustrated in FIG. 5B, a complete tree 550 includes an eighth secret key (e.g., skE) and an eighth public key (e.g., pkE) associated with Device E, while the new root node (e.g., ABCDE) is associated with a ninth secret key (e.g., skABCDE) and a ninth public key (e.g., pkABCDE). As a result of Device E being positioned closer to the root node, however, the amount of processing is vastly reduced. For example, Device E key tree 560 illustrates that the only path node is the root node, which is relabeled as ninth secret key (e.g., sk0) and ninth public key (e.g., pk0). Thus, Device E only needs to know the shared secret PS[0] associated with the root node, as well as the seventh public key (e.g., pkABCD).

As described above, the system 100 may add a new member to the binary ratchet tree group. For example, a user device and/or the cloud encryption proxy 220 may send a public key to a primary group device 110 (e.g., administrator) and the primary group device 110 may send a message to the message delivery system 210 registering the user device and/or the cloud encryption proxy 220 into the group and updating the state of the group. In some examples, the message delivery system 210 may validate the message first, as only the user (e.g., administrator, owner account, etc.) can add an additional device to the binary ratchet tree group. After validation, the message delivery system 210 may store the message for future distribution, while pushing the message to the other group members (e.g., camera device 102, group device 110, etc.). When other group members receive the message, they also validate the message, update their knowledge of the group, and the shared secret changes as a result.

In some examples, new members do not gain access to past data, because they only receive the group's shared secret moving forwards. If authorized by the user, however, the system 100 may share a list of past shared secrets with the new member device. The range of shared secrets to transmit can be limited or complete, as desired by the user.

As described above, in some examples the camera device 102 may be prioritized as part of an unbalanced binary tree that optimizes encryption processing for the camera device 102 by affirmatively placing the camera device 102 as a direct child of the root node (e.g., root node is a parent node to a first node associated with the camera device 102). Once the camera device 102 is associated with the root node, the system 100 may not move the camera device 102 within the binary tree. For example, when a new device is added to the binary ratchet tree group, the system 100 may be configured to add the new device to an opposite side of the binary tree from the camera device 102, in order to maintain the prioritization of the camera device 102. Thus, while the system 100 may not perform an explicit determination step (e.g., explicitly determine to associate the camera device 102 with the root node) each time a new device is added to the binary ratchet tree group, maintaining the unbalanced tree and prioritizing the camera device 102 inherently includes performing an implicit determination to add the new group member to the opposite side of the binary tree instead of adding the new group member to the first node associated with the camera device 102.

Figure 6A:
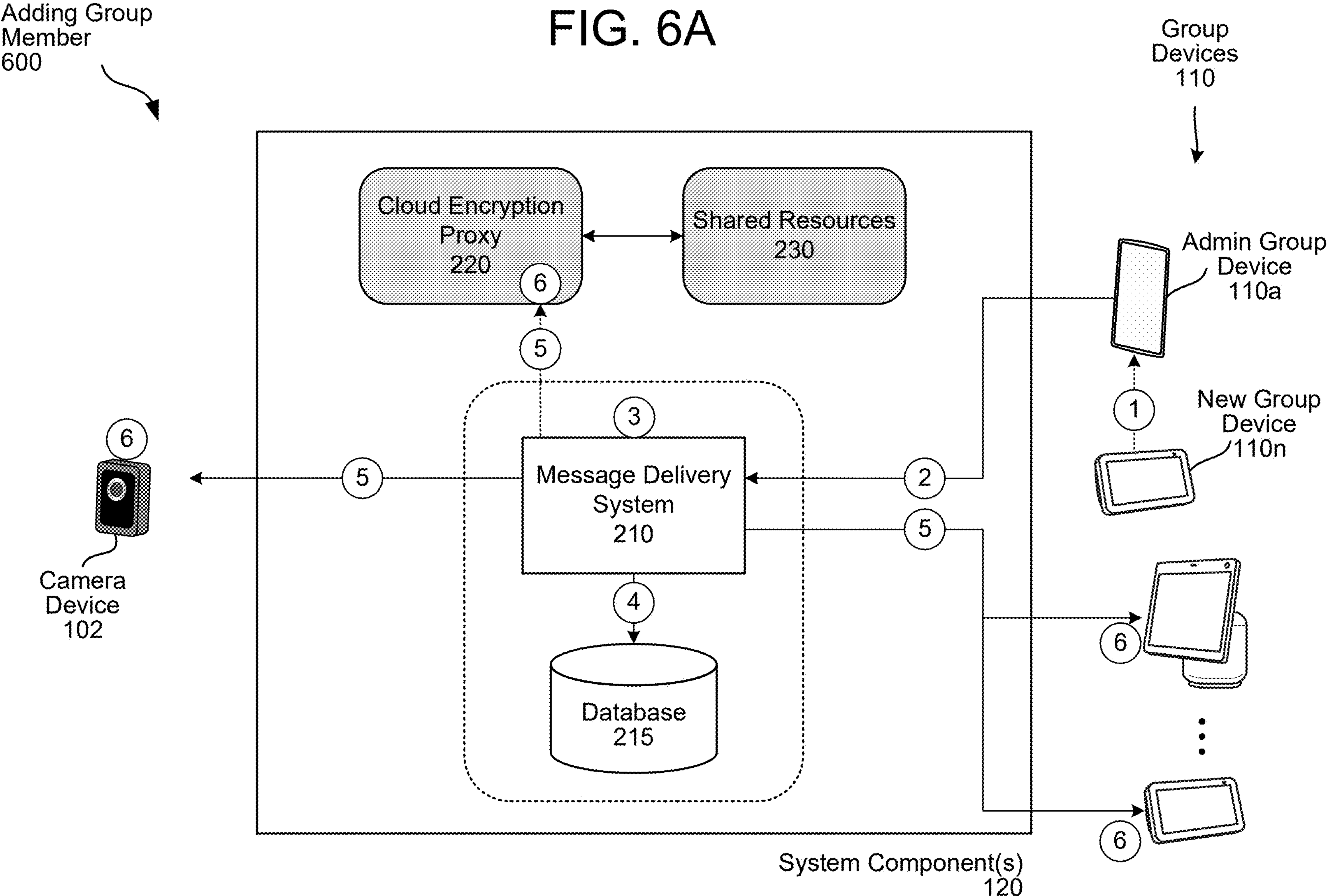
FIGS. 6A-6B illustrate examples of adding and removing group members according to embodiments of the present disclosure.
Figure 6B:
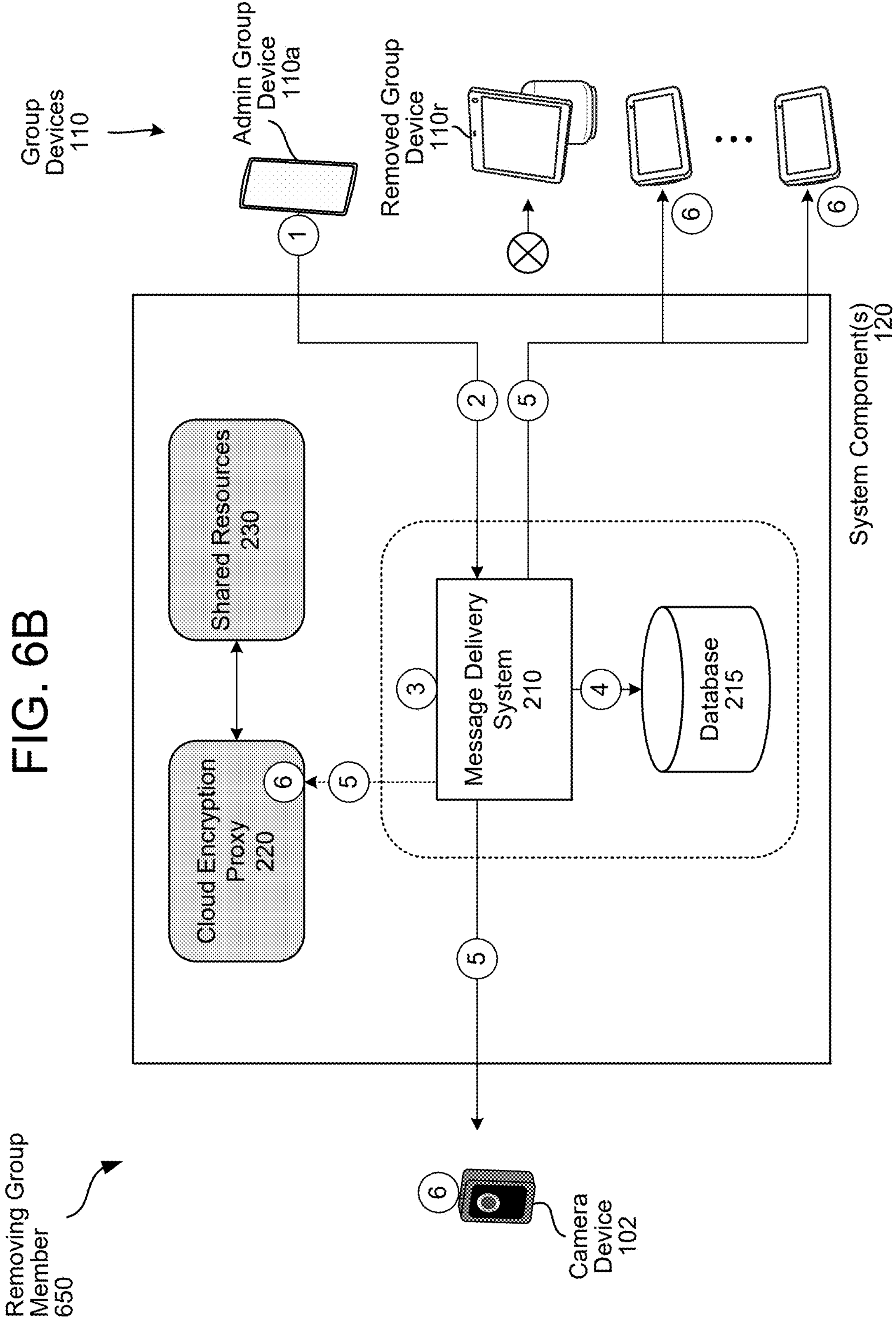

FIGS. 6A-6B illustrate examples of adding and removing group members according to embodiments of the present disclosure. As illustrated in FIG. 6A, the system 100 may perform multiple steps as part of adding a group member 600. For example, a new group device 110*n* may send a public key to an admin group device 110*a* (e.g., primary group device) to initiate the process of adding the new group device 110*n* to the binary ratchet tree group (e.g., step "1"). While FIG. 6A illustrates the new group device 110*n* being added to the binary ratchet tree group, the same process may be performed when adding the cloud encryption proxy 220, although the disclosure is not limited thereto. These processes may be limited to being performed by a device associated with a user profile authorized to perform such operations (e.g., adding and/or removing group members).

The admin group device 110*a* may send a message to the message delivery system 210 registering the user device into the group and updating the state of the group (e.g., step "2"). In some examples, the message delivery system 210 may validate the message first, as only the user (e.g., administrator, owner account, etc.) can add an additional device to the binary ratchet tree group (e.g., step "3"). After validation, the message delivery system 210 may store the message for future distribution (e.g., step "4"), while pushing the message to the other group members (e.g., step "5"). As illustrated in FIG. 6A, the other group members may include the camera device 102, other group devices 110, and optionally the cloud encryption proxy 220. When the other group members receive the message, they also validate the message, update their knowledge of the group, and the shared secret changes as a result (e.g., step "6").

In some examples, the primary role of the PEP is to check the authorization of group messages. For example, the PEP may be configured to reject attempts by certain members of the binary ratchet tree group to add or remove other members, ensuring that only an administrator (e.g., specific group device 110 associated with a primary user for an individual user profile) maintains control of the binary ratchet tree group. This is the mechanism that will enforce that a shared user can only add/remove binary ratchet tree members associated with a second user profile corresponding to the shared user (e.g., the shared user's user profile), but that the owner (e.g., primary user) of the camera device 102 can add/remove any member to or from the binary ratchet tree group. Another example would be that only the owner (e.g., primary user) can enable/disable end-to-end encryption.

The PEP may run as part of a binary ratchet tree stack on each member of the binary ratchet tree group and may validate that group messages triggering group state changes are within policy, rejecting those that are not. The PEP may also run within the message delivery system 210 to provide early validation of group commit messages to members issuing them. This avoids a situation where a group member issues group commit messages that are not within policy and being removed from the binary ratchet tree group as a result. As described in greater detail below, the PEP only relies on the public portion of the binary tree/group state. In some examples, the PEP may be implemented as a collection of values/settings that are stored within the binary ratchet tree group state, and an engine that can use those values to decide whether a group state change or an action is allowed for a specific member. To illustrate an example, if the PEP enforces that a shared user can only add members from the second user profile (e.g., shared user's own account), the binary ratchet tree group state may store values corresponding to the role of the shared user and a public portion of their account signing key. For example, a shared user may only be allowed to add another group member (e.g., add a group device 110 to the binary ratchet tree group) if the credentials in the key package for the new member are signed with the correct account signing key.

Similar to how the system 100 added a new member in FIG. 6A, the system 100 may also remove a member from the binary ratchet tree group. Referring to FIG. 6B, the system 100 may perform multiple steps as part of removing a group member 650. For example, the user may generate user input directing the admin group device 110*a* to remove a group member (e.g., group device 110 and/or the cloud encryption proxy 220) (e.g., step "1") and the admin group device 110*a* may send a message to the message delivery system 210 updating the binary ratchet tree group accordingly (e.g., step "2"). The message delivery system 210 may then validate that the message was authorized by the user and/or that the request is authorized based on user preferences and/or privacy settings associated with a user profile (e.g., step "3").

After validation, the message delivery system 210 may store the message for future distribution (e.g., step "4") while also pushing the message to the remaining members of the binary ratchet tree group (e.g., step "5"). As illustrated in FIG. 6B, the other group members may include the camera device 102, other group devices 110 (but not the removed group device 110*r*), and optionally the cloud encryption proxy 220. When the other group members receive the message, they also validate the message, update their knowledge of the group, and the shared secret changes as a result (e.g., step "6"). As the act of removing a member device updates the groups shared secret, the removed group device 110*r* can no longer access future content.

When the cloud encryption proxy 220 is operating in the high privilege mode and a member of the binary ratchet tree group, the system component(s) 120 have some level of access to the encrypted data. Thus, operating the cloud encryption proxy 220 in high privilege mode and end-to-end encryption are mutually exclusive. As a result, enabling end-to-end encryption (e.g., operating in an end-to-end encryption mode) will automatically remove the cloud encryption proxy 220 from the binary ratchet tree group and/or revoke any privileges associated with the cloud encryption proxy 220.

In some examples, the system 100 can enable end-to-end encryption by removing any cloud services from the encryption group. For example, the system 100 may generate the binary tree using a group of devices that doesn't include the system component(s) 120 or other cloud services, which may limit functionality but enables better security and/or privacy protection. As a result, only the user devices are authorized and/or capable of determining encryption keys, requiring that any other devices obtain explicit authorization from one of the user devices in order to decrypt the encrypted video data. In some examples, the system 100 may enable end-to-end encryption by removing the system component(s) 120 from the group and deleting the first encryption key(s) and/or any shared secrets associated with the system component(s) 120 upon them being removed from the group.

To illustrate an example, if the system 100 receives user input indicating that end-to-end encryption is desired, the system 100 may modify the binary tree to remove the system component(s) 120 from the group and the system component(s) 120 may delete any stored encryption keys and/or shared secrets. Using the PEP, the system 100 may additionally ensure the revocation of decryption keys for both group members and dependent services. For example, group members may experience revocation through their removal from the binary ratchet tree group, which not only prevents any future access to decryption keys but also deletes their existing store of past content decryption keys. In contrast, the system 100 enforces revocation for dependent services by eliminating the unique service signing key from its PEP, effectively blocking any group member from subsequently sharing decryption keys with a revoked cloud service.

FIG. 7 is a network communication diagram illustrating an example of generating and accessing encrypted video data according to embodiments of the present disclosure. As illustrated in FIG. 7, the camera device 102 may determine (710) first encryption key(s), may generate (712) video data, and may generate (714) encrypted video data using the first encryption key(s). For example, the camera device 102 may use the key derivation function described in greater detail above with regard to FIG. 4B to update the symmetric keys over time. As the camera device 102 generates the video data, the camera device 102 may use the current symmetric key to encrypt the video data.

The camera device 102 may send (716) the encrypted video data to the media transport system 240 and the media transport system 240 may store (718) the encrypted video data. For example, the media transport system 240 may store the encrypted video data and provide it on demand to the group devices 110 and/or shared resources 230. Thus, the group devices 110 and/or the shared resources 230 may retrieve the encrypted video data, including previously generated encrypted video data (e.g., within a fixed time period) and/or currently generated encrypted video data (e.g., liveview).

To illustrate a first example, the group device 110 may request (720) encrypted video data and the media transport system 240 may send (722) the encrypted video data. Using the encrypted video data, the group device 110 may generate (724) decrypted video data and then display (726) the decrypted video data on a display of the group device 110. For example, as the group device 110 is part of the binary tree, the group device 110 may generate the first encryption key(s) and use the first encryption key(s) to decrypt and display the encrypted video data.

To illustrate a second example, the shared resources 230 may request (728) encrypted video data and the media transport system 240 may send (730) the encrypted video data to the shared resources 230. Using the encrypted video data, the shared resources 230 may perform (732) an action, as described in greater detail below with regard to FIGS. 8A-8C. In some examples, the shared resources 230 may decrypt the encrypted video data and perform some processing, such as computer vision processing. For example, the shared resources 230 may perform object detection, facial recognition, and/or the like without departing from the disclosure. To provide enhanced security and/or privacy for the user, the shared resources 230 may delete the first encryption key(s) after processing is complete. In other examples, the shared resources 230 may interface with the cloud encryption proxy 220 to send decrypted video data to a group device 110 for playback.

Figure 8A:
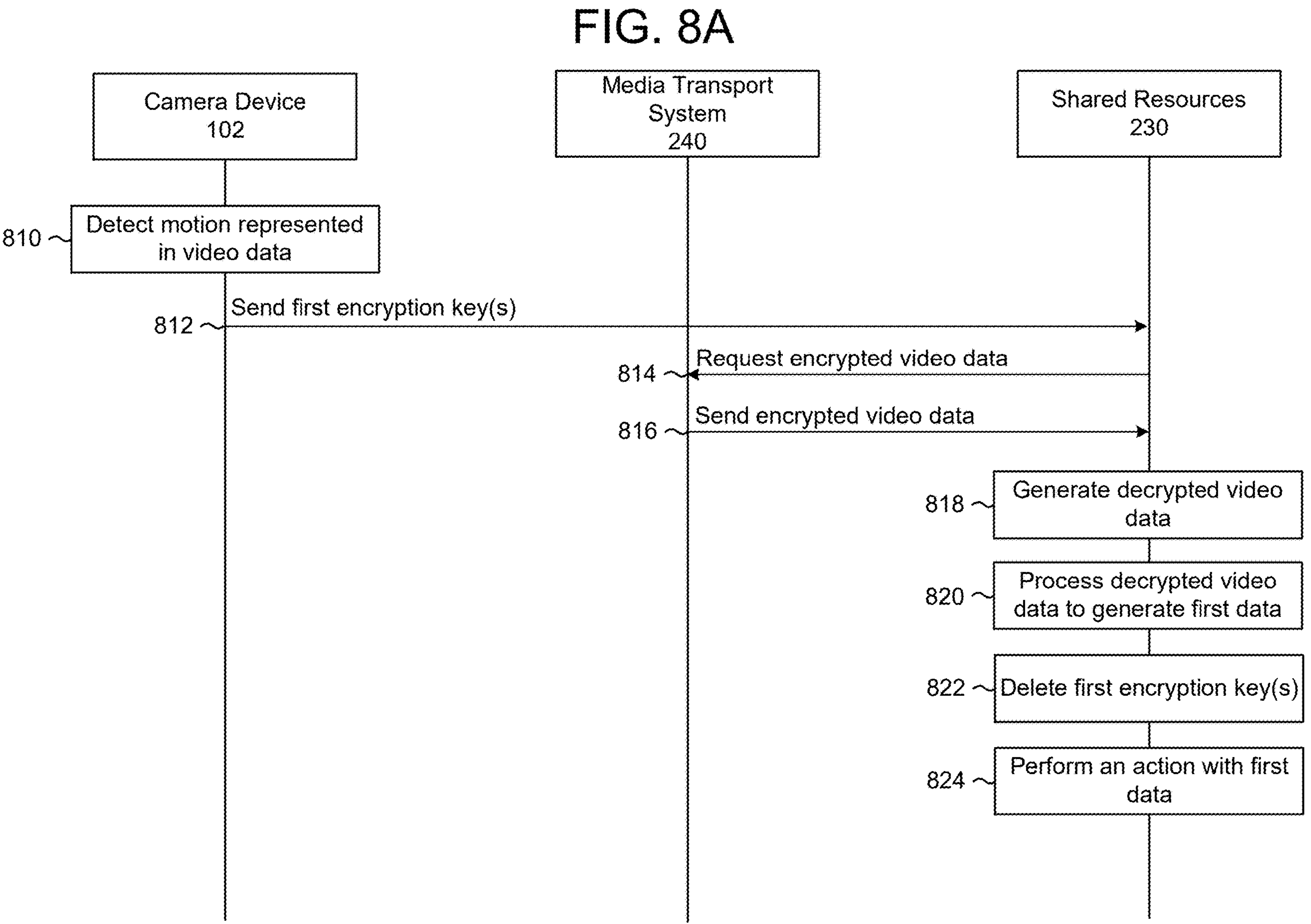
Figure 8C:
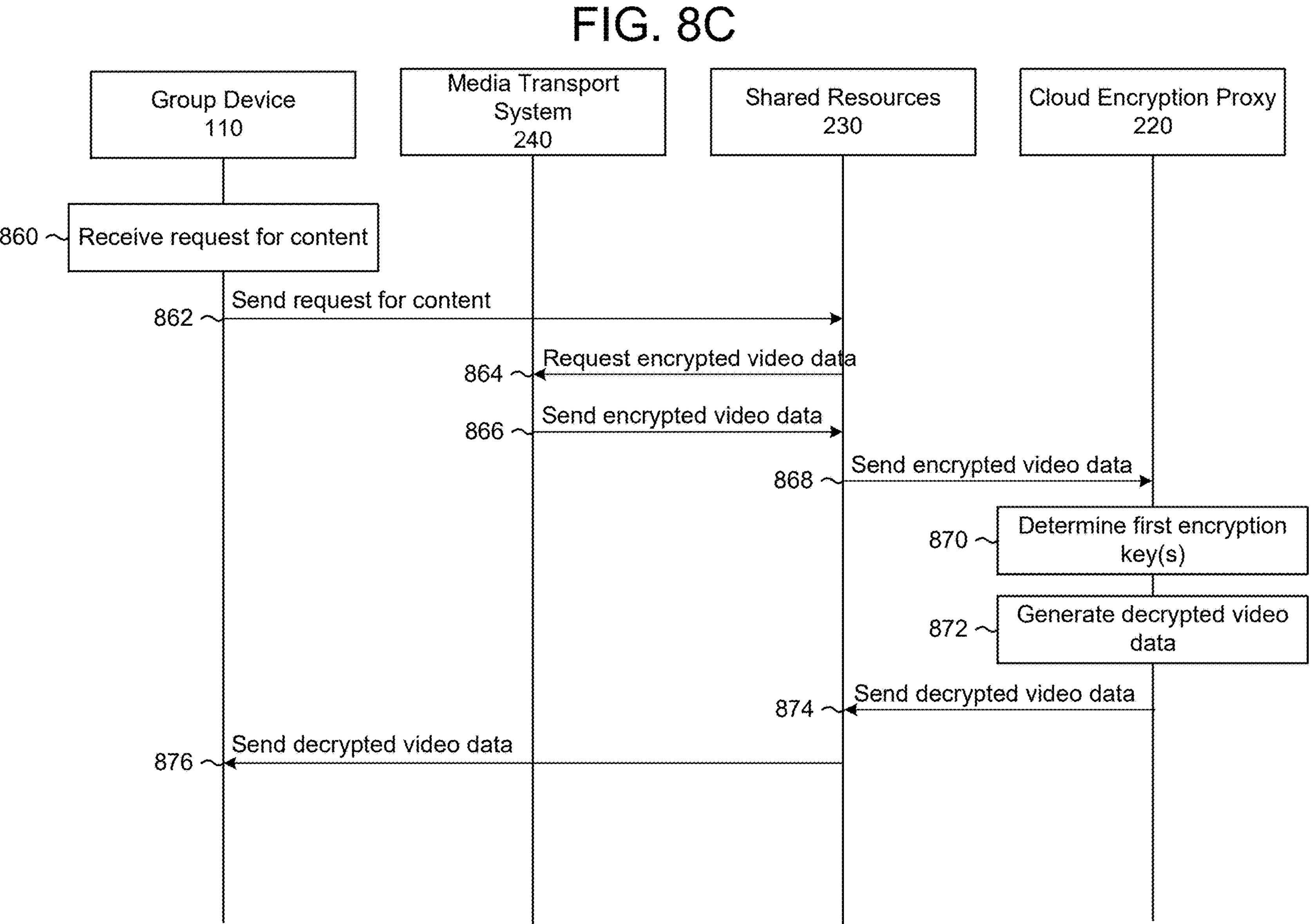

FIGS. 8A-8C are network communication diagrams illustrating examples of decrypting encrypted video data according to embodiments of the present disclosure. As described above, in some examples the system 100 may can enable end-to-end encryption and/or operate in an end-to-end encryption mode. For example, the system 100 may generate the binary tree using a group of devices that doesn't include the system component(s) 120 or other cloud services, which may limit functionality but enables better security and/or privacy protection. To enable additional functionality while operating in this end-to-end encryption mode, however, the system 100 may enable a workaround in which members of the binary ratchet tree group send encryption keys to the cloud encryption proxy 220 and/or the shared resources 230. Thus, the cloud encryption proxy 220 and/or the shared resources 230 receives explicit authorization from either the camera device 102 or a group device 110 in order to provide the additional functionality.

While not illustrated in FIGS. 8A-8C, the level of additional functionality enabled by the system 100 may be controlled by user preferences and/or privacy settings associated with a user profile. For example, the PEP engine may verify that the camera device 102 and/or the group device 110 is authorized to provide the encryption keys to the cloud encryption proxy 220 and/or the shared resources 230 prior to the encryption keys being sent. This may involve verifying that the camera device 102 and/or the group device 110 is authorized to send the encryption keys and/or verifying that the cloud encryption proxy 220 and/or the shared resources 230 are authorized to receive the encryption keys without departing from the disclosure.

As illustrated in FIG. 8A, while generating the video data the camera device 102 may detect (810) motion represented in the video data and may send (812) first encryption key(s) to the shared resources 230. For example, the shared resources 230 may be configured to perform computer vision processing (e.g., object detection, facial recognition, etc.) and the camera device 102 may send first encryption key(s) corresponding to a current time window of the encrypted video data, enabling the shared resources 230 to identify the object and/or person represented in the video data (e.g., being captured by the camera device 102).

In response to receiving the first encryption key(s), the shared resources 230 may request (814) encrypted video data corresponding to the first encryption key(s) from the media transport system 240 and the media transport system 240 may send (816) the encrypted video data to the shared resources 230. For example, the media transport system 240 may start streaming the encrypted video data in realtime (e.g., liveview), enabling the shared resources 230 to process a current video signal without providing access to any previously generated video signals (e.g., historical video data).

The shared resources 230 may generate (818) decrypted video data, process (820) the decrypted video data to generate first data, delete (822) the first encryption key(s), and perform (824) an action with the first data. For example, the shared resources 230 may perform computer vision processing to generate first data indicating one or more objects represented in the decrypted video data and/or other information, may store the first data, and/or may send the first data to the message delivery system 210 (e.g., to be stored in the database 215). Additionally or alternatively, the shared resources 230 may generate a notification using the first data and may send the notification to one or more of the group devices 110. For example, the shared resources 230 may send a notification to the user indicating that a package was delivered, that a family member was detected entering a residence, and/or the like. After processing the encrypted video data to generate the first data, the shared resources 230 deletes the first encryption key(s) and is unable to decrypt the encrypted video data without receiving subsequent permission from the camera device 102.

As illustrated in FIG. 8B, the group device 110 may receive (830) a request for content, such as user input requesting to see video currently being captured by the camera device 102. In response to the request, the group device 110 may send (832) a request for content to the shared resources 230 and may send (834) first encryption key(s) associated with the content to the cloud encryption proxy 220, granting authorization to the cloud encryption proxy 220 to decrypt the requested content.

The shared resources 230 may request (836) the encrypted video data from the media transport system 240, the media transport system 240 may send (838) the encrypted video data to the shared resources 230, and the shared resources 230 may send (840) the encrypted video data on to the cloud encryption proxy 220 for decryption. Using the first encryption key(s) received from the group device 110, the cloud encryption proxy 220 may generate (842) decrypted video data using the first encryption key(s), delete (844) the first encryption key(s), and send (846) the decrypted video to the shared resources 230. The shared resources 230 may then send (848) the decrypted video data to the group device 110.

In the example illustrated in FIG. 8B, the cloud encryption proxy 220 is operating in a low privilege mode and must receive authorization from the group device 110 to decrypt the encrypted video data. For example, the cloud encryption proxy 220 is unable to decrypt the encrypted video data until the group device 110 sends the first encryption key(s) to the cloud encryption proxy 220. The disclosure is not limited thereto, however, and the cloud encryption proxy 220 may instead operate in a high privilege mode and be included in the binary tree. For example, the cloud encryption proxy 220 may also be a group member, such that the cloud encryption proxy 220 is authorized to generate the first encryption key(s) independently from the group device 110.

As illustrated in FIG. 8C, the group device 110 may receive (860) a request for content, such as user input requesting to see video currently being captured by the camera device 102. In response to the request, the group device 110 may send (862) a request for content to the shared resources 230. In this example, the group device 110 does not need to send the first encryption key(s) to the cloud encryption proxy 220, as the cloud encryption proxy 220 is configured to generate the first encryption key(s) itself.

The shared resources 230 may request (864) the encrypted video data from the media transport system 240, the media transport system 240 may send (866) the encrypted video data to the shared resources 230, and the shared resources 230 may send (868) the encrypted video data on to the cloud encryption proxy 220 for decryption. As the cloud encryption proxy 220 is operating in a high privilege mode and is a member of the group, the cloud encryption proxy 220 may determine (870) the first encryption key(s), may generate (872) decrypted video data using the first encryption key(s), and send (874) the decrypted video to the shared resources 230. The shared resources 230 may then send (876) the decrypted video data to the group device 110.

Figure 9:
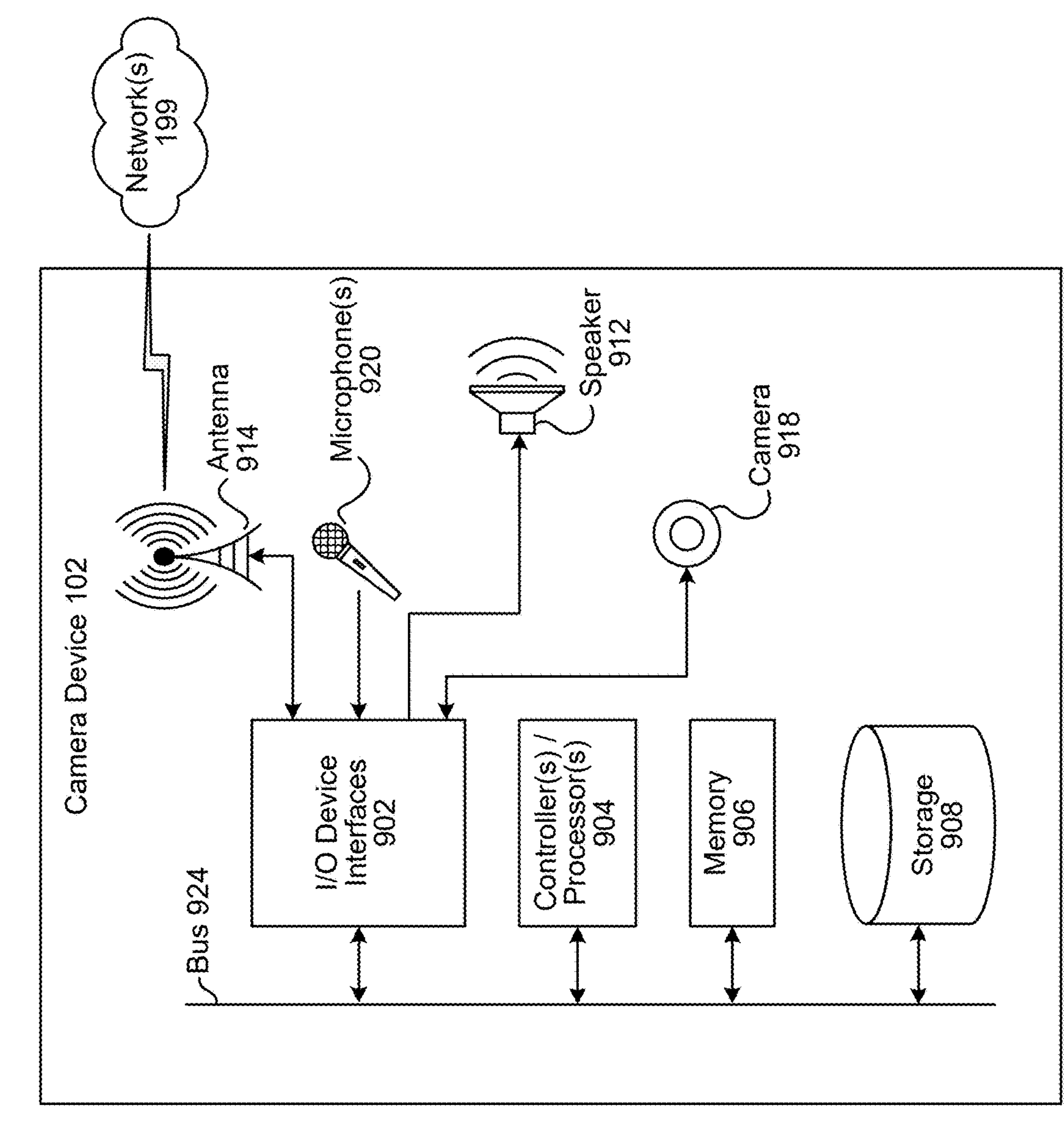
FIG. 9 is a block diagram conceptually illustrating example components of a device according to embodiments of the present disclosure.
Figure 10:
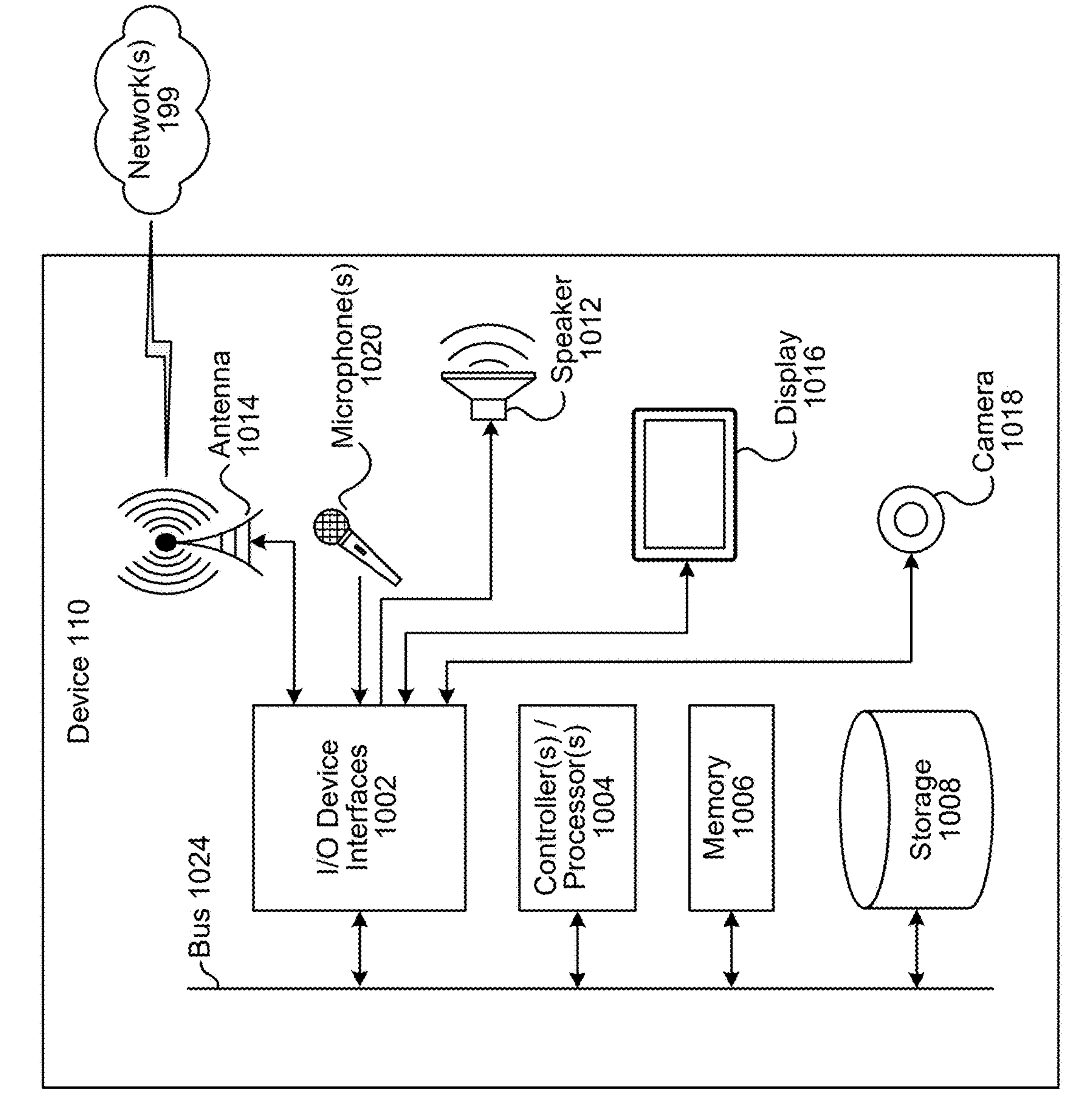
FIG. 10 is a block diagram conceptually illustrating example components of a device according to embodiments of the present disclosure.

FIG. 9 is a block diagram conceptually illustrating a camera device 102 that may be used with the system. FIG. 10 is a block diagram conceptually illustrating a device 110 that may be used with the system. FIG. 11 is a block diagram conceptually illustrating example components of system component(s) 120 according to embodiments of the present disclosure. The system component(s) 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system component(s) 120 may be configured to operate using one or more of a client-server model, a computer bureau model, grid computing techniques, fog computing techniques, mainframe techniques, utility computing techniques, a peer-to-peer model, sandbox techniques, or other computing techniques.

Each of these devices (102/110/120) may include one or more controllers/processors (904/1004/1104), which may each include a central processing unit (CPU) for processing data and computer-readable instructions, and a memory (906/1006/1106) for storing data and instructions of the respective device. The memories (906/1006/1106) may individually include volatile random access memory (RAM), non-volatile read only memory (ROM), non-volatile magnetoresistive memory (MRAM), and/or other types of memory. Each device (102/110/120) may also include a data storage component (908/1008/1108) for storing data and controller/processor-executable instructions. Each data storage component (908/1008/1108) may individually include one or more non-volatile storage types such as magnetic storage, optical storage, solid-state storage, etc. Each device (102/110/120) may also be connected to removable or external non-volatile memory and/or storage (such as a removable memory card, memory key drive, networked storage, etc.) through respective input/output device interfaces (902/1002/1102).

Computer instructions for operating each device (102/110/120) and its various components may be executed by the respective device's controller(s)/processor(s) (904/1004/1104), using the memory (906/1006/1106) as temporary "working" storage at runtime. A device's computer instructions may be stored in a non-transitory manner in non-volatile memory (906/1006/1106), storage (908/1008/1108), or an external device(s). Alternatively, some or all of the executable instructions may be embedded in hardware or firmware on the respective device in addition to or instead of software.

Each device (102/110/120) includes input/output device interfaces (902/1002/1102). A variety of components may be connected through the input/output device interfaces (902/1002/1102), as will be discussed further below. Additionally, each device (102/110/120) may include an address/data bus (924/1024/1124) for conveying data among components of the respective device. Each component within a device (102/110/120) may also be directly connected to other components in addition to (or instead of) being connected to other components across the bus (924/1024/1124).

Referring to FIG. 9, the camera device 102 may include input/output device interfaces 902 that connect to a variety of components such as an audio output component such as a speaker 912, an audio capture component such as microphone(s) 920 or array of microphones, and/or a camera 918 to capture image data, although the disclosure is not limited thereto. In comparison to the group device 110, the camera device 102 is a constrained device that is resource-limited. For example, the camera device 102 may be an embedded camera device or the like, with limited processing capabilities.

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content and/or a camera 1018 to capture image data, although the disclosure is not limited thereto.

Via antenna(s) 914/1014, the input/output device interfaces 902/1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002/1102) may also include communication components that allow data to be exchanged between devices such as different physical servers in a collection of servers or other components.

The components of the device(s) (102/110/120) may include their own dedicated processors, memory, and/or storage. Alternatively, one or more of the components of the device(s) (102/110/120) may utilize the I/O interfaces (902/1002/1102), processor(s) (904/1004/1104), memory (906/1006/1106), and/or storage (908/1008/1108) of the device(s) (102/110/120).

As noted above, multiple devices may be employed in a single system. In such a multi-device system, each of the devices may include different components for performing different aspects of the system's processing. The multiple devices may include overlapping components. The components of the device(s) (102/110/120), as described herein, are illustrative, and may be located as a stand-alone device or may be included, in whole or in part, as a component of a larger device or system.

Figure 12:
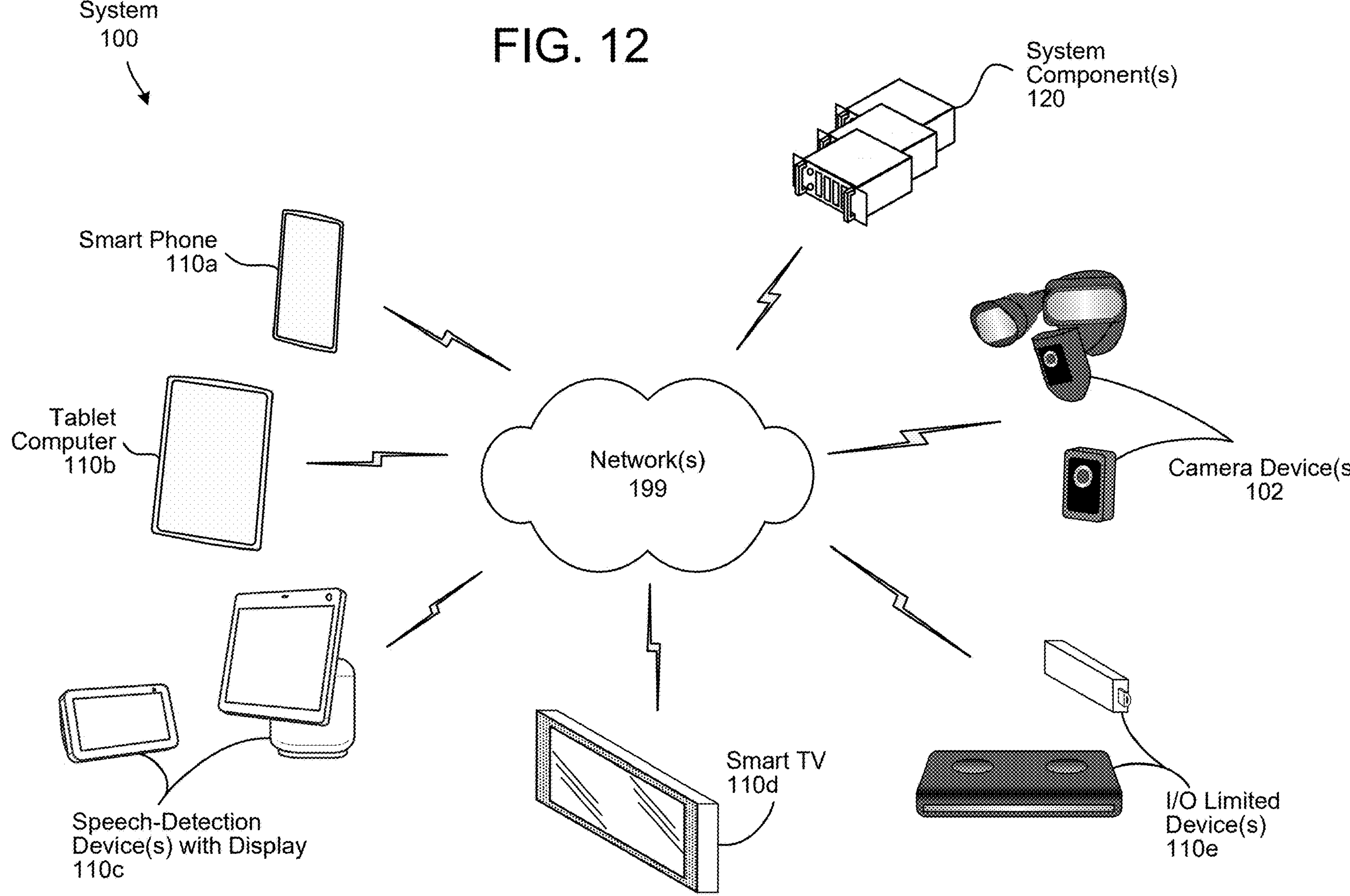
FIG. 12 illustrates an example of a computer network for use with a speech processing system.

As illustrated in FIG. 12, multiple devices (102, 110*a*-110*e*, 120) may contain components of the system and the devices may be connected over a network(s) 199. The network(s) 199 may include a local or private network or may include a wide network such as the Internet. Devices may be connected to the network(s) 199 through either wired or wireless connections. For example, one or more camera(s) 102, a smart phone 110*a*, a tablet computer 110*b*, a speech-detection device with display 110*c*, a display/smart television 110*d*, an input/output (I/O) limited device 110*e* (e.g., a device such as a FireTV stick or the like), and/or the like may be connected to the network(s) 199 through a wireless service provider, over a WiFi or cellular network connection, or the like. Other devices are included as network-connected support devices, such as system component(s) 120 and/or others. The support devices may connect to the network(s) 199 through a wired connection or wireless connection.

The camera device 102 may comprise a video doorbell device (that may be mounted on a building proximate to a door) with a built-in camera that can send image/video data to a remote server, user device, or the like. Using operations described herein, images detected by a camera device 102 may be analyzed (such as using a machine learning model) to detect a representation of an object which may result in an alert being sent to a user device. For example, the object may include a package, a person, an animal, a vehicle, or the like. Alerts may be customized depending on the detected object. For example, a user device may be sent a package alert, a person alert, a vehicle alert, etc. Such a user device may include a phone, table, television, smart watch, personal assistant device with a display screen, heads-up display such as in smart glasses, etc.

In accordance with one or more implementations, a binary ratchet tree approach is utilized to facilitate an end to end encryption mode, where a camera device and one or more user profiles or user devices are members of a binary ratchet tree group, but a cloud system that operates to receive image data from the camera device is not a member. The members of the group are able to derive content encryption keys that are used by the camera device to encrypt image data. This encrypted image data is sent to the cloud system, which may store it and send it onward to user devices, but may not be able to decrypt due to not having the content encryption key.

In accordance with one or more implementations in which a cloud service is not a member of a binary ratchet tree group used for determination of content encryption keys used to encrypt image data from a camera device, it may sometimes be desirable for a cloud service to nonetheless access or process image data from the camera device, e.g. for computer vision (cv) processing using one or more machine learning models. In accordance with one or more implementations, a cv signing key is provisioned in the privacy enforcement policy and represents part of a binary ratchet tree group state. Upon determining that it needs to access or decrypt image data from a camera device (e.g. based on a message received that was sent by a camera device based on motion detection at the camera device using a passive infrared sensor), a cv service generates an ephemeral public-private key pair and sends the public key to the camera device signed with the cv signing key. The camera device, upon receiving this message, confirms that the signature is valid, and then if so encrypts a content encryption key (e.g. the one used to encrypt the image data that the cv service needs access to) with the public key received from the cv service. The cv service receives the encrypted content encryption key, and decrypts it with the private key corresponding to the public key that it sent to the camera device. The cv service then decrypts encrypted image data received from the camera device using the decrypted content encryption key, and performs cv processing using the image data, e.g. using one or more machine learning models (such as a convolutional neural network, visual transformer, etc.).

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

storing, at a first user device, binary tree data representing a binary ratchet tree where each leaf node represents a member of a first group associated with a first camera device;

displaying, on an electronic display of the first user device, a graphical user interface including one or more interface elements prompting a user to enable end to end encryption for the first camera device, wherein enabling end to end encryption causes removal of cloud services from the first group;

receiving, at the first user device, user input indicating to enable end to end encryption for the first camera device;

in response to the receiving of the user input indicating to enable end to end encryption for the first camera device, sending a first message from the first user device to a remote system;

based on the first message:

determining, at the remote system, that a first user profile is authorized to remove members from the first group, and sending, from the remote system to the first camera device, an indication to remove a first node from the binary ratchet tree, the first node corresponding to a cloud service;

modifying, at the first user device, the binary tree data to remove the first node from the binary ratchet tree;

following removal of the first node from the binary ratchet tree, determining, at the first user device, an updated node secret corresponding to a root node of the binary ratchet tree;

receiving, at the remote system from the first camera device, encrypted first image data encrypted using a key determined based on the updated node secret corresponding to the root node of the binary ratchet tree; and sending the encrypted first image data to the first user device.

2. The computer-implemented method of claim 1, further comprising:

receiving, at the first user device, the encrypted first image data from the remote system;

generating, at the first user device using the updated node secret, a first encryption key; and decrypting the encrypted first image data using the first encryption key to produce decrypted image data.

3. The computer-implemented method of claim 1, wherein both prior to and following removal of the first node from the binary ratchet tree:

the binary ratchet tree is an unbalanced binary tree;

the unbalanced binary tree includes a first child node descending from a root node and a second child node descending from the root node;

the second child node corresponds to the first camera device;

the second child node does not have any descendant nodes; and the unbalanced binary tree includes more than three leaf nodes that are descendants of the first child node.

4. A computer-implemented method comprising:

storing, at a first user device, binary tree data representing a binary ratchet tree where each leaf node represents a member of a first group associated with a first camera device;

displaying, on an electronic display of the first user device, a graphical user interface including one or more interface elements prompting a user to enable end to end encryption for the first camera device, wherein enabling end to end encryption causes removal of cloud services from the first group;

receiving, at the first user device, user input indicating to enable end to end encryption for the first camera device;

based on the receiving of the user input indicating to enable end to end encryption for the first camera device:

sending a first message from the first user device to a remote system, and modifying, at the first user device, the binary tree data to remove a first node from the binary ratchet tree, the first node corresponding to a cloud service;

determining, at the first user device following removal of the first node from the binary ratchet tree, an updated node secret corresponding to a root node of the binary ratchet tree;

receiving, at the first user device, first image data from the remote system;

generating, at the first user device using the updated node secret, a first encryption key; and decrypting the first image data using the first encryption key to produce decrypted image data.

5. The computer-implemented method of claim 4, wherein both prior to and following removal of the first node from the binary ratchet tree:

the binary ratchet tree is an unbalanced binary tree.

6. The computer-implemented method of claim 5, wherein both prior to and following removal of the first node from the binary ratchet tree:

the unbalanced binary tree includes a first child node descending from a root node and a second child node descending from the root node;

the second child node corresponds to the first camera device;

the second child node does not have any descendant nodes; and the unbalanced binary tree includes more than three leaf nodes that are descendants of the first child node.

7. The computer-implemented method of claim 5, wherein the first camera device is a security camera device mounted on a building.

8. The computer-implemented method of claim 5, wherein the first camera device is a video doorbell device mounted on a building proximate a door.

9. The computer-implemented method of claim 5, wherein the first user device is a phone.

10. The computer-implemented method of claim 5, wherein the first user device is a tablet.

11. The computer-implemented method of claim 5, wherein the first user device is a television.

12. The computer-implemented method of claim 5, wherein the first user device is a personal assistant device with a display screen.

13. The computer-implemented method of claim 5, further comprising:

receiving, at the first user device, second user input indicating to disable end to end encryption for the first camera device;

in response to the receiving of the second user input indicating to disable end to end encryption for the first camera device, sending a second message from the first user device to the remote system;

based on the second message:

determining, at the remote system, that a first user profile is authorized to add members to the first group, sending, from the remote system to the first camera device, an indication to add a second node to the binary ratchet tree, the second node corresponding to the cloud service, and storing, at the remote system, second binary tree data representing the binary ratchet tree;

determining, at the remote system, a second node secret corresponding to the root node of the binary ratchet tree;

receiving, at the remote system from the first camera device, encrypted second image data encrypted using a second key determined based on the second node secret corresponding to the root node of the binary ratchet tree;

generating, at the remote system using the second node secret, a second encryption key;

decrypting, at the remote system, the encrypted second image data using the second encryption key to produce decrypted second image data;

analyzing the decrypted second image data using a first machine learning model; and based on the analyzing of the decrypted second image data using the first machine learning model, sending an alert to the first user device.

14. A computer-implemented method comprising:

storing, at a first user device, first binary tree data representing a binary ratchet tree where each leaf node represents a member of a first group associated with a first camera device;

displaying, on an electronic display of the first user device, a graphical user interface including one or more interface elements prompting a user to disable end to end encryption for the first camera device, wherein disabling end to end encryption causes a cloud service to be added to the first group;

receiving, at the first user device, user input indicating to disable end to end encryption for the first camera device;

in response to the receiving of the user input indicating to disable end to end encryption for the first camera device, sending a first message from the first user device to a remote system;

based on the first message, determining, at the remote system, that a first user profile is authorized to add members to the first group, sending, from the remote system to the first camera device, an indication to add a first node to the binary ratchet tree, the first node corresponding to the cloud service, and storing, at the remote system, second binary tree data representing the binary ratchet tree;

determining, at the remote system, a node secret corresponding to a root node of the binary ratchet tree;

receiving, at the remote system from the first camera device, encrypted first image data encrypted using a key determined based on the node secret corresponding to the root node of the binary ratchet tree;

generating, at the remote system using the node secret, a first encryption key;

decrypting, at the remote system, the encrypted first image data using the first encryption key to produce decrypted image data;

analyzing the decrypted image data using a first machine learning model; and based on the analyzing of the decrypted image data using the first machine learning model, sending an alert to a user device.

15. The computer-implemented method of claim 14, further comprising:

detecting, based on the analyzing of the decrypted image data using the first machine learning model, a package, and wherein the alert comprises a package alert.

16. The computer-implemented method of claim 14, further comprising:

detecting, based on the analyzing of the decrypted image data using the first machine learning model, a person, and wherein the alert comprises a person alert.

17. The computer-implemented method of claim 14, wherein the first camera device is a security camera device mounted on a building.

18. The computer-implemented method of claim 14, wherein the first camera device is a video doorbell device mounted on a building proximate a door.

19. The computer-implemented method of claim 5, wherein both prior to and following removal of the first node from the binary ratchet tree:

the binary ratchet tree is an unbalanced binary tree;

the first camera device corresponds to a first leaf node;

a root node of the binary ratchet tree is a parent node to the first leaf node; and the unbalanced binary tree includes more than three leaf nodes that are not direct children of the root node.

20. The computer-implemented method of claim 5, wherein determining the updated node secret further comprises:

determining, at the first user device following removal of the first node from the binary ratchet tree, an updated path secret corresponding to the root node of the binary ratchet tree; and deriving the updated node secret from the updated path secret using a key derivation function.

* * * * *